(12) United States Patent
Lee et al.

(10) Patent No.: US 12,519,360 B2
(45) Date of Patent: Jan. 6, 2026

(54) COIL SUBSTRATE FOR IMAGE STABILIZATION

(71) Applicant: LG INNOTEK CO., LTD., Seoul (KR)

(72) Inventors: Sang Kyu Lee, Seoul (KR); Hyung Kyu Yoon, Seoul (KR); Seung Jin Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 587 days.

(21) Appl. No.: 17/906,161

(22) PCT Filed: Mar. 12, 2021

(86) PCT No.: PCT/KR2021/003123
§ 371 (c)(1),
(2) Date: Sep. 12, 2022

(87) PCT Pub. No.: WO2021/182924
PCT Pub. Date: Sep. 16, 2021

(65) Prior Publication Data
US 2023/0114245 A1 Apr. 13, 2023

(30) Foreign Application Priority Data
Mar. 12, 2020 (KR) .......................... 10-2020-0030771

(51) Int. Cl.
H02K 3/26 (2006.01)
H02K 41/035 (2006.01)

(52) U.S. Cl.
CPC ............ H02K 3/26 (2013.01); H02K 41/0354 (2013.01); G03B 2205/0015 (2013.01); G03B 2205/0023 (2013.01); H02K 2203/03 (2013.01)

(58) Field of Classification Search
CPC .. H02K 3/26; H02K 41/0354; H02K 2203/03; H02K 41/0356;
(Continued)

(56) References Cited

U.S. PATENT DOCUMENTS 9,768,674 B2 9/2017 Elenga et al.
9,806,565 B2 10/2017 An et al.
(Continued)

FOREIGN PATENT DOCUMENTS

CN 104638778 A 5/2015
CN 205211518 U 5/2016
(Continued)

OTHER PUBLICATIONS

KR20160122955A English translation (Year: 2025).*
(Continued)

Primary Examiner — Christopher M Koehler
Assistant Examiner — Viswanathan Subramanian
(74) Attorney, Agent, or Firm — Saliwanchik, Lloyd & Eisenschenk

(57) ABSTRACT

A coil substrate according to an embodiment includes an insulating layer; a first coil pattern portion disposed on one surface of the insulating layer; a second coil pattern portion disposed on the other surface of the insulating layer; and a pad portion disposed on the one surface of the insulating layer and connected to the first coil pattern portion, wherein the first coil pattern portion includes: an inner coil pattern portion; and an outer coil pattern portion spaced apart from the inner coil pattern portion at a predetermined interval and disposed outside the inner coil pattern portion, wherein the pad portion is disposed between the inner coil pattern portion and the outer coil pattern portion.

17 Claims, 14 Drawing Sheets

(58) Field of Classification Search
CPC .... G03B 2205/0015; G03B 2205/0023; G03B 5/04; H04N 23/60; H04N 23/54; H04N 23/685

See application file for complete search history.

(56) References Cited

U.S. PATENT DOCUMENTS

| | | | |
|---|---|---|---|
| 9,989,726 | B2 | 6/2018 | Huang et al. |
| 10,147,529 | B2 | 12/2018 | Nishino et al. |
| 10,261,284 | B2 | 4/2019 | Huang et al. |
| 10,270,291 | B2 | 4/2019 | An et al. |
| 10,277,071 | B2 | 4/2019 | An et al. |
| 10,564,384 | B2 | 2/2020 | Huang et al. |
| 10,600,544 | B2 | 3/2020 | Nishino et al. |
| 10,804,740 | B2 | 10/2020 | An et al. |
| 10,804,784 | B2 | 10/2020 | Ito |
| 11,309,114 | B2 | 4/2022 | Nishino et al. |
| 11,657,944 | B2 | 5/2023 | Tsuda et al. |
| 2011/0204732 | A1 | 8/2011 | Miayamoto et al. |
| 2013/0249302 | A1 | 9/2013 | An et al. |
| 2015/0076929 | A1 | 3/2015 | Elenga et al. |
| 2016/0012950 | A1 | 1/2016 | Nishino et al. |
| 2016/0252703 | A1 | 9/2016 | Lin et al. |
| 2017/0076859 | A1 | 3/2017 | An et al. |
| 2017/0082827 | A1* | 3/2017 | Park .................. H04N 23/54 |
| 2017/0146769 | A1 | 5/2017 | Huang et al. |
| 2017/0155281 | A1 | 6/2017 | An et al. |
| 2018/0027651 | A1* | 1/2018 | Lim .................... H05K 1/144 361/749 |
| 2018/0252891 | A1 | 9/2018 | Huang et al. |
| 2019/0066895 | A1 | 2/2019 | Nishino et al. |
| 2019/0165609 | A1 | 5/2019 | An et al. |
| 2019/0204530 | A1 | 7/2019 | Huang et al. |
| 2019/0207500 | A1 | 7/2019 | Ito |
| 2020/0176164 | A1 | 6/2020 | Nishino et al. |
| 2020/0227984 | A1 | 7/2020 | Park |
| 2021/0116670 | A1 | 4/2021 | Park et al. |
| 2022/0208428 | A1 | 6/2022 | Tsuda et al. |

FOREIGN PATENT DOCUMENTS

| | | |
|---|---|---|
| CN | 108206088 A | 6/2018 |
| JP | 2002-134322 A | 5/2002 |
| JP | 2005-245135 A | 9/2005 |
| JP | 2007-252124 A | 9/2007 |
| JP | 2007-295780 A | 11/2007 |
| JP | 2015-228521 A | 12/2015 |
| JP | 2017-49603 A | 3/2017 |
| JP | 2017-99273 A | 6/2017 |
| KR | 10-0779981 B1 | 11/2007 |
| KR | 10-1617124 B1 | 4/2016 |
| KR | 10-2016-0122955 A | 10/2016 |
| KR | 10-2017-0036347 A | 4/2017 |
| KR | 10-2017-0082805 A | 7/2017 |
| KR | 10-2018-0050279 A | 5/2018 |
| KR | 10-2018-0071443 A | 6/2018 |
| KR | 10-2018-0071644 A | 6/2018 |
| KR | 10-2019-0013388 A | 2/2019 |
| WO | 2010/050285 A1 | 5/2010 |
| WO | 2015/039047 A1 | 3/2015 |
| WO | 2015/079773 A1 | 6/2015 |
| WO | 2018/199150 A1 | 11/2018 |
| WO | 2021/193771 A1 | 9/2021 |

OTHER PUBLICATIONS

International Search Report dated Jun. 28, 2021 in International Application No. PCT/KR2021/003123.

Office Action dated Jun. 6, 2023 in Japanese Application No. 2022-554640.

Office Action dated Nov. 21, 2023 in Japanese Application No. 2022-554640.

Office Action dated Dec. 24, 2024 in Chinese Application No. 202180035209.X.

Office Action dated Jun. 11, 2025 in Chinese Application No. 202180035209.

* cited by examiner

COIL SUBSTRATE FOR IMAGE STABILIZATION

CROSS-REFERENCE TO RELATED APPLICATIONS

This application is the U.S. national stage application of International Patent Application No. PCT/KR2021/003123, filed Mar. 12, 2021, which claims the benefit under 35 U.S.C. § 119 of Korean Application No. 10-2020-0030771, filed Mar. 12, 2020, the disclosures of each of which are incorporated herein by reference in their entirety.

TECHNICAL FIELD

The embodiment relates to a coil substrate for image stabilization and a camera module including the same.

BACKGROUND ART

As various portable terminals are widely used and the wireless Internet service is commercialized, needs of consumers related to the portable terminals are diversified, and accordingly, various kinds of additional devices are installed in the portable terminals.

A representative one of them is a camera module that may photograph a subject in a photograph or a moving image, store the image data, and then edit and transmit the image data as needed.

In recent years, there has been an increasing demand for small camera modules for use in various multimedia fields such as note type personal computers, camera phones, PDAs, smart devices, toys, etc., and for image input devices such as surveillance cameras and information terminals of video tape recorders.

Conventional camera modules may be roughly classified into camera modules such as a fixed focus (F.F) type, auto focus (A.F) type, and optical image stabilization (OIS) type.

Meanwhile, the OIS type may include a coil pattern disposed on a circuit board as a component for realizing a hand shake prevention function. In this case, the coil pattern includes a plurality of bent regions, and a photosensitive pattern collapses during a process in the bent regions, so that coil electrodes included in the coil pattern may be shorted to each other.

Accordingly, there is a need for a coil pattern capable of improving reliability by solving the above problems and a camera module including the coil pattern.

DISCLOSURE

Technical Problem

The embodiment is to provide a coil substrate having improved reliability and a camera module including the same.

The embodiment is to provide a coil substrate having a structure capable of maximizing a Lorentz force generated in the coil substrate in a limited space and a camera module including the same.

The embodiment is to provide a coil substrate having a structure in which a pad portion and a coil pattern are disposed on the same layer, and a camera module including the same.

The technical problem to be solved in the embodiment is not limited to the technical problem mentioned above, and another technical problem not mentioned will be clearly understood by those of ordinary skill in the art to which the present invention belongs from the following description.

Technical Solution

A coil substrate according to an embodiment includes an insulating layer; a first coil pattern portion disposed on one surface of the insulating layer; a second coil pattern portion disposed on the other surface of the insulating layer; and a pad portion disposed on the one surface of the insulating layer and connected to the first coil pattern portion, wherein the first coil pattern portion includes: an inner coil pattern portion; and an outer coil pattern portion spaced apart from the inner coil pattern portion at a predetermined interval and disposed outside the inner coil pattern portion, wherein the pad portion is disposed between the inner coil pattern portion and the outer coil pattern portion.

In addition, the second coil pattern portion is formed by winding from inside to outside, on the other surface of the insulating layer, in the same direction as the inner coil pattern portion and the outer coil pattern portion.

In addition, the pad portion includes: a first pad portion connected to one end of the outer coil pattern portion; and a second pad portion connected to the other end of the inner coil pattern portion.

In addition, the first pad portion includes: a first-first unit pad connected to one end of the outer coil pattern portion; a first-second unit pad spaced apart from the first-first unit pad; and a first connection pattern connecting the first-first unit pad and the first-second unit pad; wherein the second pad portion includes: a second-first unit pad connected to the other end of the inner coil pattern portion; a second-second unit pad spaced apart from the second-first unit pad; and a second connection pattern connecting the second-first unit pad and the second-second unit pad.

In addition, the coil substrate further includes a first via passing through the insulating layer and having one surface connected to the other end of the outer coil pattern portion and the other surface connected to the other end of the second coil pattern portion; and a second via passing through the insulating layer and having one surface connected to one end of the inner coil pattern portion and the other surface connected to one end of the second coil pattern portion.

In addition, an outer width of the first coil pattern portion corresponding to an outer width of the outer coil pattern portion is the same as an outer width of the second coil pattern portion, and wherein an inner width of the first coil pattern portion corresponding to an inner width of the inner coil pattern portion is the same as an inner width of the second coil pattern portion.

In addition, the coil substrate further includes a first dummy pattern portion disposed on the one surface of the insulating layer and spaced apart from the first coil pattern portion; and a second dummy pattern portion disposed on the other surface of the insulating layer and spaced apart from the second coil pattern portion.

In addition, the first dummy pattern portion is formed between the outer coil and the inner coil.

In addition, at least one of the first coil pattern portion and the second coil pattern portion includes: a first region extending in a first direction; a second region extending in a second direction different from the first direction; and a third region in which a directionality of the coil pattern portion is changed between the first region and the second region; wherein an interval between coil pattern portions in the third region is greater than an interval between coil pattern portions in the first region or the second region.

In addition, at least one of the inner coil pattern portion, the outer coil pattern portion, and the second coil pattern portion includes: a first part disposed on an innermost side; a second part disposed on an outermost side; and a third part between the first part and the second part; and wherein at least one of a line width of the first part and a line width of the second part is greater than a line width of the third part.

On the other hand, a camera module according to the embodiment includes a first mover disposed on a side surface of a lens portion to move the lens portion; a second mover positioned opposite to the first mover on a side surface of the first mover; a stator positioned opposite to a lower side of the second mover to move the second mover and having a through hole corresponding to the lens portion formed in a center; and a base supporting the stator and the second mover and having a hollow hole in a center corresponding to the through hole of the second mover; wherein the stator includes a driving substrate and two or more coil substrates disposed on the driving substrate, wherein each of the coil substrates includes an insulating layer; a first coil pattern portion disposed on one surface of the insulating layer; a second coil pattern portion disposed on the other surface of the insulating layer; and a pad portion disposed on the one surface of the insulating layer and connected to the first coil pattern portion, wherein the first coil pattern portion includes: an inner coil pattern portion; and an outer coil pattern portion spaced apart from the inner coil pattern portion at a predetermined interval and disposed outside the inner coil pattern portion, and wherein the pad portion includes: a first via passing through the insulating layer and having one surface connected to the other end of the outer coil pattern portion and the other surface connected to the other end of the second coil pattern portion; and a second via passing through the insulating layer and having one surface connected to one end of the inner coil pattern portion and the other surface connected to one end of the second coil pattern portion.

Advantageous Effects

The coil substrate according to the embodiment includes a first coil pattern portion 820 disposed on a lower surface of the insulating layer 810 and a second coil pattern portion 830 disposed on an upper surface of the insulating layer 810. In this case, the first coil pattern portion 820 and the second coil pattern portion 830 may be wound in the same direction from the inside to the outside. Accordingly, a process of forming the coil pattern on the insulating layer 810 of the embodiment can be simplified by forming the first coil pattern portion 820 and the second coil pattern portion 830 to be wound in the same direction from the inside to the outside. In addition, since current flows in the same direction in the inner/outer coils of the first coil pattern portion 820 of the embodiment, a Lorentz force generated according to a rotational direction of a coil may be maximized. In addition, it is possible to secure the Lorentz force for OIS with only two layers of coil patterns.

In addition, the first coil pattern portion 820 of the embodiment includes an outer coil pattern portion 821 disposed on the outside thereof with the first pad portion 840a and the second pad portion 840b therebetween, and an inner coil pattern portion 822 disposed on the inside thereof. The coil pattern portion and the pad portion of the embodiment are disposed on the same layer, and thereby, there is no need to additionally configure a separate layer to form the pad portion, and accordingly, it is possible to achieve simplification of the manufacturing process and reduction of manufacturing cost. In addition, since a number of turns of the first coil pattern portion 820 can be increased, the Lorentz force generated by the first coil pattern portion 820 can be maximized, and accordingly, OIS operation reliability can be secured only with a two-layer structure.

In addition, the coil pattern portion of the embodiment includes an inner coil pattern portion 822 and an outer coil pattern portion 821 respectively disposed the outside and the inside the first pad portion 840a and the second pad portion 840b rather than on one side of the first pad portion 840a and the second pad portion 840b. Accordingly, an overall width of the outer side of the first coil pattern portion 820 may be maintained to the maximum, and thus the strength of the Lorentz force may be increased. In addition, positional balance with the magnet portion in the vertical direction of the embodiment may be maintained by disposing the inner coil pattern portion 822 and the outer coil pattern portion 821 on each of the outside and the inner side of the first pad portion 840a and the second pad portion 840b. In other words, it is possible to minimize the phenomenon that the Lorentz force generated when the first coil exists only on one side of the inside/outside is biased toward either side of the inside/outside, and accordingly, the reliability of the OIS operation may be improved.

In addition, the bonding between the driving substrate 410 and the coil substrate is not performed using only one unit pad, but bonding is performed between the terminal of the driving substrate 410 and the coil substrate at a plurality of positions using a plurality of unit pads. Accordingly, a contact area between the terminal of the driving substrate and the pad portion of the coil substrate according to the embodiment may be improved, and thus mutual electrical connectivity may be improved.

In addition, the first dummy pattern portion 850 and the second dummy pattern portion 860 of the embodiment are formed in a region where the first coil pattern portion 820 and the second coil pattern portion 830 are not disposed on the upper and lower surfaces of the insulating layer 810. According to this, a plating area in which plating is performed in an entire region of the insulating layer can be made uniform by the formation of the first dummy pattern portion 850 and the second dummy pattern portion 860, and accordingly, the plating thicknesses of the first coil pattern portion 820 and the second coil pattern portion 830 may be uniformly controlled.

Therefore, it is possible to sufficiently secure the thickness of the coil pattern portion that serves to inhibit hand shake of the camera module according to the embodiment, thereby reducing the resistance of the coil substrate. Accordingly, the electromotive force of the coil substrate can be sufficiently generated, thereby improving the characteristics of the coil substrate and improving the hand shake prevention characteristics of the camera module including the same.

In addition, an interval of the coil pattern portions may be formed differently for each region in the coil substrate of the embodiment. In detail, the coil pattern portion may be formed so that the interval between the patterns in the bending region is greater than the interval between the patterns in the other regions. Accordingly, when forming the coil pattern portion of the embodiment, it is possible to increase a line width of a photosensitive pattern, thereby inhibiting the photosensitive pattern from collapsing, which is weakly supported in the bent region. Specifically, the photosensitive pattern can be stably formed even in the bent region by forming the photosensitive pattern larger than other regions in the bent region implemented with the fine line width of the embodiment. Accordingly, the coil substrate according to the embodiment may inhibit a short circuit between the coil patterns in the bending region, thereby improving reliability.

In addition, the line width of the innermost and/or outermost portion of the coil pattern portions in the coil substrate of the embodiment may be formed to be different from the line width of the patterns disposed therebetween. In detail, the line width of the innermost and/or outermost portion of the coil pattern portions in the embodiment may be formed to be greater than the line width of the patterns disposed therebetween. Accordingly, in the embodiment, the resistance may be reduced by increasing the pattern line width, which is one variable of the resistance of the coil pattern portion.

BEST MODE

Hereinafter, embodiments of the present disclosure will be described in detail with reference to the accompanying drawings.

However, the spirit and scope of the present disclosure is not limited to a part of the embodiments described, and may be implemented in various other forms, and within the spirit and scope of the present disclosure, one or more of the elements of the embodiments may be selectively combined and replaced.

In addition, unless expressly otherwise defined and described, the terms used in the embodiments of the present disclosure (including technical and scientific terms) may be construed the same meaning as commonly understood by one of ordinary skill in the art to which the present disclosure belongs, and the terms such as those defined in commonly used dictionaries may be interpreted as having a meaning that is consistent with their meaning in the context of the relevant art. In addition, the terms used in the embodiments of the present disclosure are for describing the embodiments and are not intended to limit the present disclosure.

In this specification, the singular forms may also include the plural forms unless specifically stated in the phrase, and may include at least one of all combinations that may be combined in A. B, and C when described in "at least one (or more) of A (and), B, and C". Further, in describing the elements of the embodiments of the present disclosure, the terms such as first, second, A, B, (a), and (b) may be used.

These terms are only used to distinguish the elements from other elements, and the terms are not limited to the essence, order, or order of the elements. In addition, when an element is described as being "connected" "coupled", or "connected" to another element, it may include not only when the element is directly "connected" to, "coupled" to, or "connected" to other elements, but also when the element is "connected", "coupled", or "connected" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements. Furthermore, when expressed as "on (over)" or "under (below)", it may include not only the upper direction but also the lower direction based on one element.

Hereinafter, circuit boards according to embodiments will be described with reference to drawings.

Figure 1:
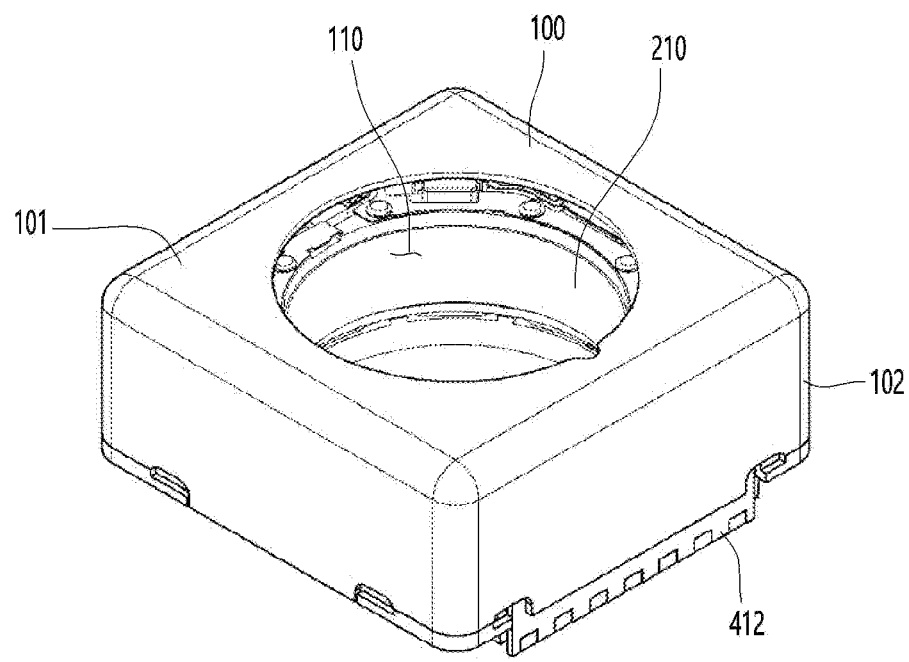
FIG. 1 is a perspective view of a camera module according to an embodiment.
Figure 2:
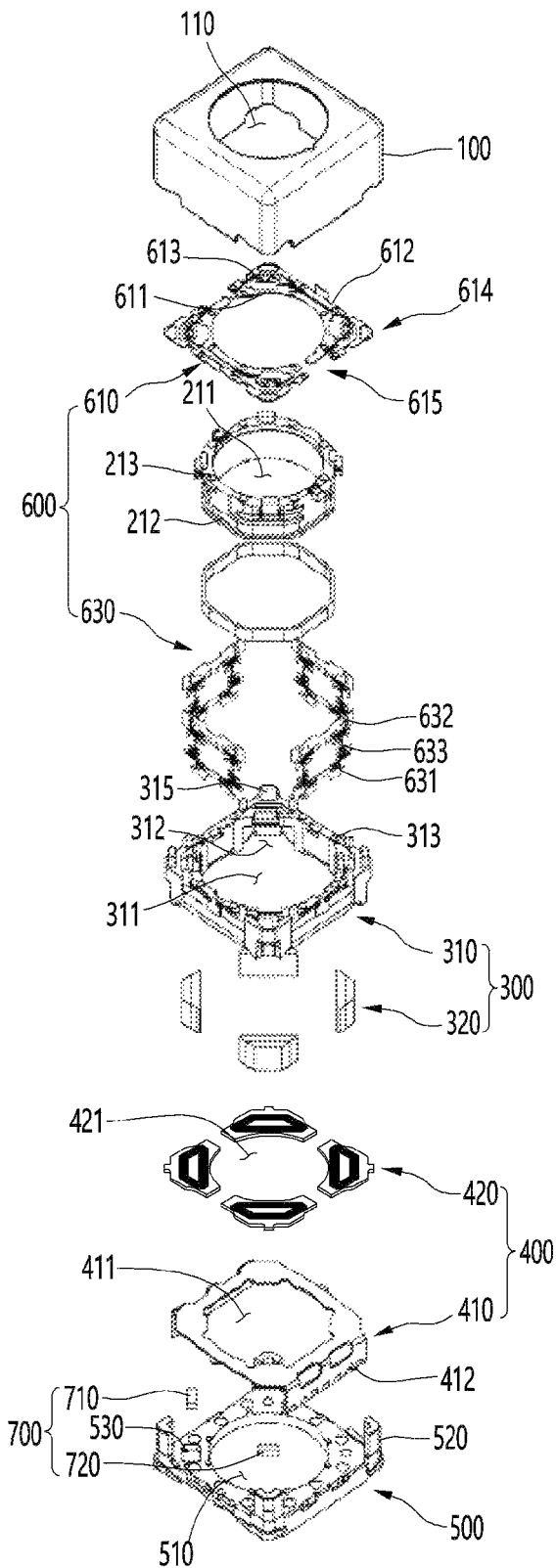
FIG. 2 is an exploded perspective view of a camera module according to an embodiment.
Figure 3A:
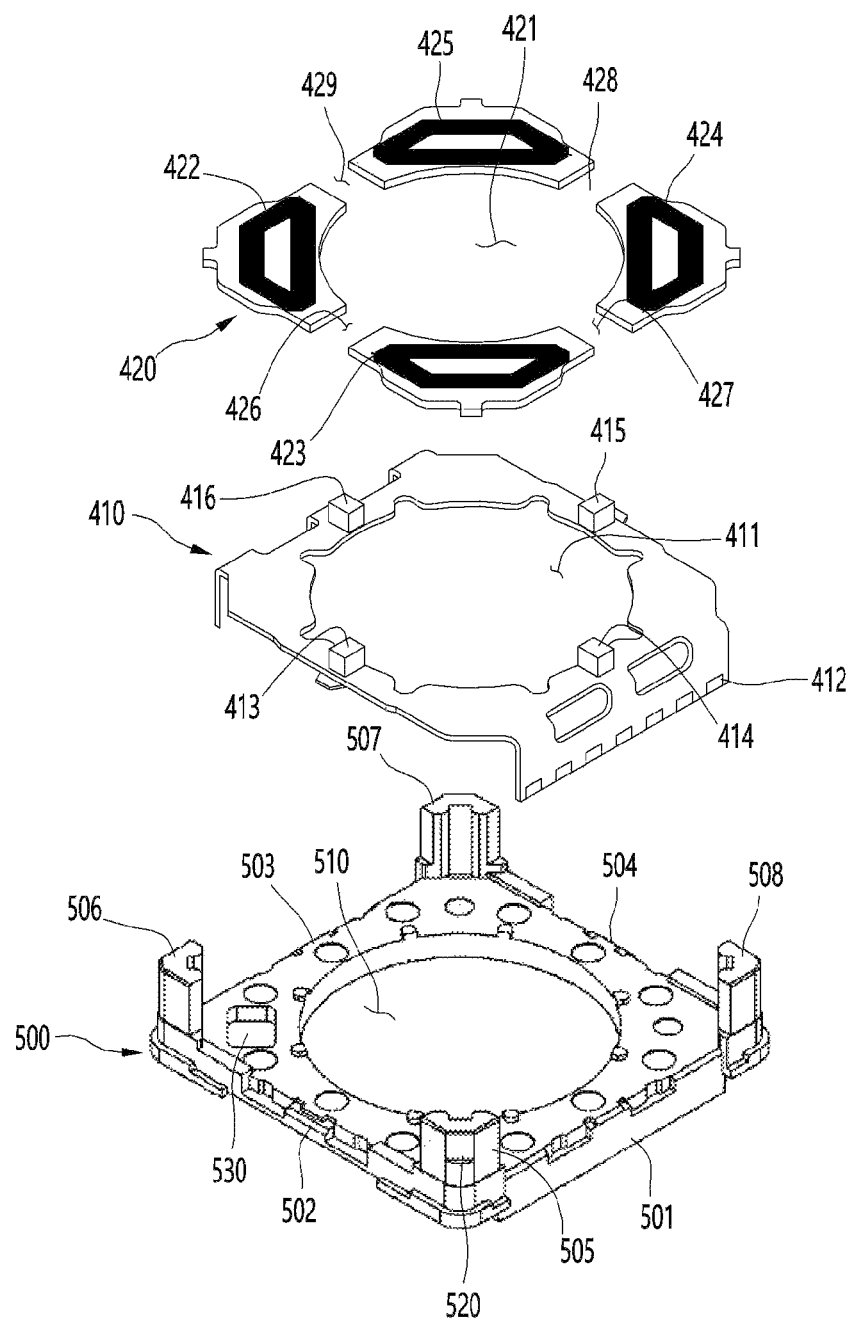
FIG. 3A is an exploded perspective view showing a partial configuration of a camera module according to an embodiment.
Figure 3B:
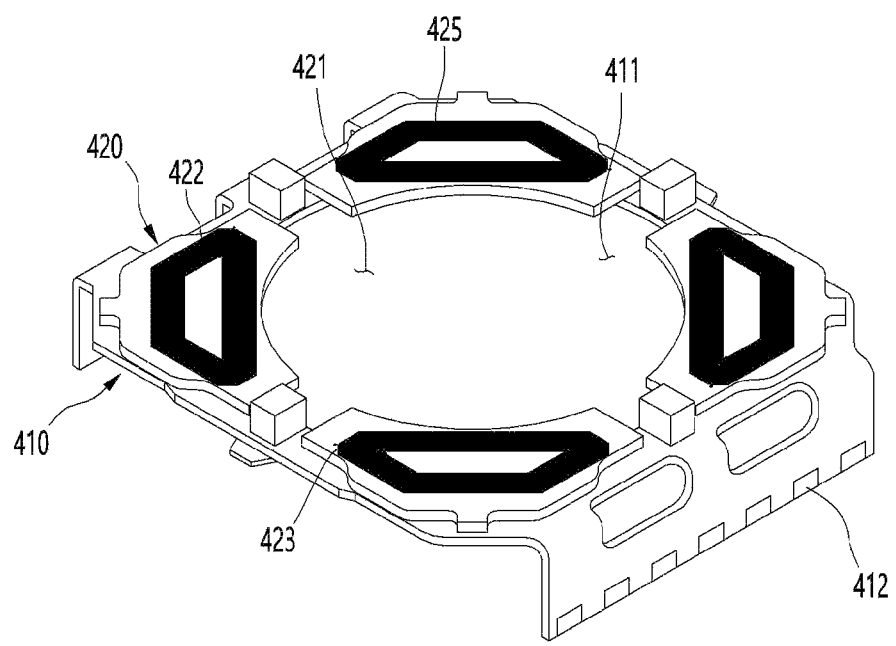
FIG. 3B is a coupling view of a driving substrate and a coil substrate of FIG. 3A.
Figure 3C:
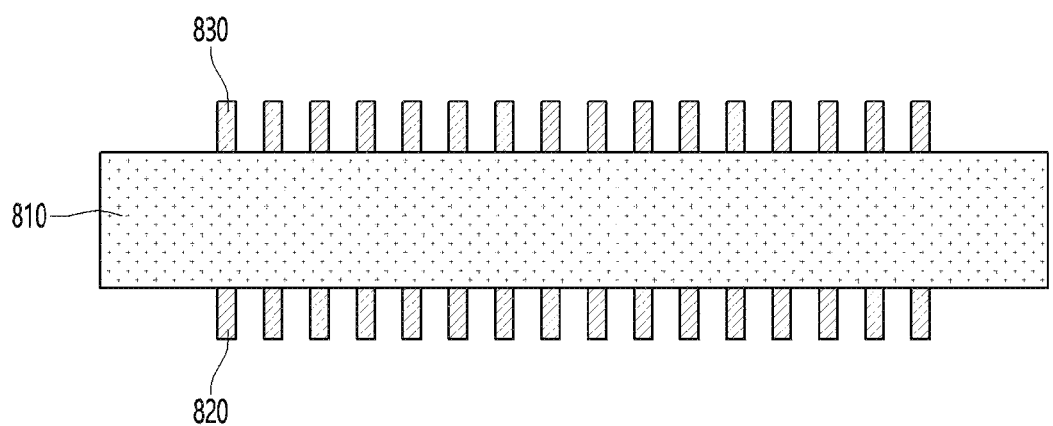
FIG. 3C is a schematic cross-sectional view of the coil substrate of FIG. 3A.

FIG. 1 is a perspective view of a camera module according to an embodiment, FIG. 2 is an exploded perspective view of a camera module according to an embodiment, FIG. 3A is an exploded perspective view showing a partial configuration of a camera module according to an embodiment, FIG. 3B is a coupling view of a driving substrate and a coil substrate of FIG. 3A, and FIG. 3C is a schematic cross-sectional view of the coil substrate of FIG. 3A.

An "optical axis direction" as used hereinafter may be defined as an optical axis direction of a lens module in a state of being coupled to a camera module. Meantime, the "optical axis direction" may be interchangeably used with "upper-lower direction", "z axis direction", "vertical direction" and the like.

An "auto focus function" as used hereinafter may be defined as a function of automatically matching a focus relative to an object by adjusting a distance from an image sensor by moving a lens module to an optical axis direction. Meantime, the "auto focus" may be interchangeably used with "AF". A "handshake correction function" as used hereinafter may be defined as a function of moving or tilting a lens module to a direction perpendicular to an optical axis direction in order to offset vibration (movement) generated on the image sensor by an outer force. Meantime, the "handshake correction" may be interchangeably used with an "DIS (Optical Image Stabilization)".

Hereinafter, a configuration of an optical apparatus including the camera module according to the present embodiment will be described.

The optical apparatus according to the present embodiment may be a hand phone, a mobile phone, a smart phone, a portable smart device, a digital camera, a notebook computer (laptop computer), a digital broadcasting terminal, Personal Digital Assistants (PDA), a PMP (Portable Multimedia Player) and a navigation device, but the embodiment is not limited thereto, and may include any device capable of photographing an image or a photograph.

The optical apparatus according to the present embodiment may include a main body (not shown), a display unit (not shown) disposed on one surface of the main body to display information, and a camera (not shown) installed on the main body to take an image or a photograph and having a camera module (not shown).

Hereinafter, a configuration of the camera module according to the present embodiment will be described.

The camera module may further include a lens module (not shown), an infrared cut-off filter (not shown), a PCB (Printed Circuit Board, not shown), an image sensor (not shown), and a controller (not shown).

The lens module may include at least one or more lenses. The lens module may include a lens and a lens barrel. The lens module may include one or more lenses (not shown) and a lens barrel accommodating the one or more lenses. However, one element of the lens module is not limited by the lens barrel, and any holder structure capable of supporting one or more lenses will suffice. The lens module may be coupled to the camera module and move together with the camera module. The lens module may be coupled to inside of the camera module, for example. The lens module may be screw-coupled to the camera module, for example. The lens module may be coupled to the camera module by an adhesive (not shown), for example. Meanwhile, a light passing through the lens module may be irradiated to an image sensor.

The infrared cut-off filter may serve to inhibit a light of infrared ray region from entering an image sensor. The infrared cut-off filter may be interposed between a lens module and an image sensor, for example. The infrared cut-off filter may be disposed at a holder member (not shown) separately formed independent from a base 500. However, the infrared filter may be installed in a through hole 510 formed in a center of the base 500. The infrared cut-off filter may be formed with a film material or a glass material, for example. The infrared cut-off filter may be formed by allowing an infrared cut-off coating material to be coated on a plate-shaped optical filter such as an imaging plane protection cover glass or a cover glass, for example.

A PCB (printed circuit board) may support a camera module. An image sensor may be mounted on the PCB. As an example, an image sensor may be positioned inside an upper surface of the PCB, and a sensor holder (not shown) may be positioned outside an upper surface of the PCB. A camera module may be positioned on the sensor holder. Alternatively, the camera module may be positioned outside the upper surface of the PCB, and the image sensor may be positioned inside the upper surface of the PCB. Through such a structure, light passing through the lens module accommodated inside the camera module may be irradiated to the image sensor mounted on the PCB.

A PCB may supply power to a camera module. Meanwhile, a controller for controlling the camera module may be positioned on the PCB.

An image sensor may be mounted on a PCB. The image sensor may be positioned to coincide with an optical axis of the lens module. Through this, the image sensor may acquire the light passing through the lens module. The image sensor may output an irradiated light as an image. The image sensor may be, for example, a charge coupled device (CCD), a metal oxide semiconductor (MOS), a CPD, and a CID. However, the type of the image sensor is not limited thereto.

The controller may be mounted on a PCB. The controller may be disposed at an outside of the camera module. However, the controller may be also disposed at an inside of the camera module. The controller may individually control a direction, intensity and an amplitude of a current supplied to each element forming the camera module. The controller may perform any one of an AF function and an OIS function of the camera module by controlling the camera module. That is, the controller may move the lens module to an optical axis direction or tile the lens module to a direction orthogonal to the optical axis direction by controlling the camera module.

Furthermore, the controller may perform any one or more of feedback controls in the AF function and OTS function. To be more specific, the controller may provide a more accurate auto focus function and OIS function by controlling a current or a power supplied to first driving portion 220 to third driving portion 420 by receiving a position of bobbin 210 or a housing 310 detected by a sensor portion (not shown).

Specifically, the camera module according to the embodiment may include a cover member 100, a first mover 200, a second mover 300, a stator 300, a base 500, a support member 600, and a sensor portion. However, the camera module according to the exemplary embodiment may omit any one of the cover member 100, the first mover 200, the second mover 300, the stator 300, the support member 600, and the sensor portion. In particular, the sensor portion may be omitted because the sensor portion is an element for AF feedback function and/or OIS feedback function.

The cover member 100 may form an exterior look of the camera module. The cover member 100 may take a bottom-opened cubic shape. However, the shape of the cover member 100 is not limited thereto.

The cover member 100 may be formed with a metal material, for example. To be more specific, the cover member 100 may be formed with a metal plate. In this case, the cover member 100 may inhibit shield an EMI (Electromagnetic Interference). Because of this characteristic in the cover member 100, the cover member 100 may be called an "EMI shield can". The cover member 100 may inhibit electric waves generated from outside of the camera module from entering an inside of the cover member 100. Furthermore, the cover member 100 may inhibit the electric waves generated from inside of the cover member 100 from being emitted to outside of the cover member 100. However, the material of cover member 100 is not limited thereto.

The cover member 100 may include an upper plate 101 and a lateral plate 102. The cover member 100 may include an upper plate 101 and a lateral plate 102 extended from an outer periphery of the upper plate 101 to a lower side. A lower end of the lateral plate 102 of the cover member 100 may be mounted on the base 500. The cover member 100 may be mounted on the base 500 by allow an inside surface to be adhered to a portion or all of a lateral surface of the base 500. An inner space formed by the cover member 100 and the base 500 may be disposed with the first mover 200, the second mover 300, the stator 300 and the support member 600. Through this configuration, the cover member 100 can protect inner elements from an external impact and simultaneously inhibit infiltration of external foreign objects. However, the embodiment is not limited thereto, and a lower end of the lateral plate 102 of the cover member 100 may be directly coupled to the PCB disposed at a lower side of the base 500.

The cover member 100 may include an opening 110 formed at the upper plate 101 to expose the lens module. The opening 110 may be formed in a shape corresponding to that of the lens module. A size of opening 110 may be formed to be greater than that of a diameter of the lens module in order to allow the lens module to be assembled through the opening 110. Meantime, a light introduced through the opening 110 may pass through the lens module. At this time, the light having passed the lens module may be obtained by the image sensor as an image.

The first mover 200 may be coupled to a lens module. A lens module may be accommodated inside the first mover 200. An inner peripheral surface of the first mover 200 may be coupled to an outer peripheral surface of the lens module. The first mover 200 may move integrally with the lens module through an interaction with the second mover 300 and/or with the stator 400. That is, the first mover 200 may move with the lens module.

The first mover 200 may include a bobbin 210 and a first driving portion 220. The first mover 200 may include a bobbin 210 coupled to the lens module. The first mover 200 may include a first driving portion 220 disposed at the bobbin 210 to be moved through an interaction with a second driving portion 320.

The bobbin 210 may be coupled to the lens module. To be more specific, an inner peripheral surface of bobbin 210 may be coupled to an outer peripheral surface of lens module. The first driving portion 220 may be coupled to the bobbin 210. An upper portion of the bobbin 210 may be coupled to an upper support member 610. The bobbin 210 may be positioned inside the housing 310. The bobbin 210 may move relative to the housing 310 in the optical axis direction.

The bobbin 210 may include a lens receptor portion 211, a first driving portion coupling portion 212, and an upper coupling portion 213.

The bobbin 210 may be disposed at an inside with an upper/bottom-opened lens receptor portion 211. The bobbin 210 may include a lens receptor portion 211 formed at an inside. The lens receptor portion 211 may be coupled with the lens module. An inner peripheral surface of lens receptor portion 211 may be formed with a screw thread in a shape corresponding to that of a screw thread formed at an outer peripheral surface of the lens module. That is, the lens receptor portion 211 may be screw-connected by the lens module. An adhesive may be interposed between the lens module and the bobbin 210. At this time, the adhesive may be an epoxy cured by UV and heat. That is, the lens module and the bobbin 210 may be adhered by UV-curing epoxy and/or a heat-curing epoxy.

The bobbin 210 may include a first driving portion coupling portion 212 disposed with the first driving portion 220. The first driving portion coupling portion 212 may be integrally formed with an outer circumferential surface of bobbin 210. Furthermore, the first driving portion coupling portion 212 may be continuously formed along the outer peripheral surface of bobbin 210 or may be formed by being spaced apart from the outer peripheral surface of bobbin 210. For example, the first driving portion coupling portion 212 may be formed by allowing a portion of the outer circumferential surface of bobbin 210 to be recessed in a shape corresponding to that of the first driving portion 220, At this time, a coil of the first driving portion 220 may be directly wound on the first driving portion coupling portion 212. In a modification, the first driving portion coupling portion 212 may be formed in an upper or a bottom side-opened shape. At this time, the coil of the first driving portion 220 may be inserted and coupled to the first driving portion coupling portion 212 through the opened portion while the coil is in a pre-wound state.

The bobbin 210 may include an upper coupling portion 213 coupled with the upper support member 610. The upper coupling portion 213 may be coupled with an inner peripheral surface 612 of the upper support member 610, For example, a lug (not shown) of the upper coupling portion 213 may be coupled by being inserted into a groove or a hole (not shown) of the inner peripheral surface 612 of the upper support member 610. At this time, the lug of the upper coupling portion 213 may fix the upper support member 610 by being fused in a state of being inserted into a hole of the inner peripheral surface 612.

The first driving portion 220 may be disposed at the bobbin 210. The first driving portion 220 may be disposed to face a second driving portion 320. The first driving portion 220 may move the bobbin 210 relative to the housing 310 through an electromagnetic interaction with the second driving portion 320.

The first driving portion 220 may include a coil. At this time, the first driving portion 220 may be called an AF (Auto Focus) coil portion. Furthermore, the first driving portion 220 may be called a 'first coil portion' in order to be distinguished from other elements formed with a coil portion. The AF coil portion may be disposed at the bobbin 210. The AF coil portion may be wound on an outer circumferential surface of bobbin 210 by being guided to the first driving portion coupling portion 212. Furthermore, in another exemplary embodiment, the AF coil portion may be formed with four (4) independent coils, each spaced apart, and the four coils may be disposed at an outer peripheral surface of bobbin 210 to allow forming a 90° between adjacent two coils. The AF coil portion may face a driving magnet portion of the second driving portion 320. That is, the AF coil portion may be so disposed as to electromagnetically interact with the driving magnet portion.

The AF coil portion may include a pair of lead cables in order to supply a power. In this case, the pair of lead cables on the AF coil portion may be electrically coupled to first and second upper support units 614 and 615, which are divided elements of the upper support member 610. That is, the AF coil portion may receive a power through the upper support member 610. Meantime, when a power is supplied to the AF coil portion, an electromagnetic field may be generated about the AF coil portion. In a modification, the first driving portion 220 may include a magnet portion.

At this time, the second driving portion 320 may include a coil portion.

The second mover 300 may move in order to perform an OIS function. The second mover 300 may be disposed at an outside of the first mover 200 to face the first mover 200 and may move the first mover 200 or may move along with the first mover 200. The second mover 300 may be movably supported by the stator 300 and/or the base 500 disposed at a lower side. The second mover 300 may be disposed at an inner space of the cover member 100.

The second mover 300 may include a housing 310 and a second driving portion 320. The second mover 300 may include a housing 310 disposed at an outside of the bobbin 210. Furthermore, the second mover 300 may include a second driving portion 320 disposed to face the first driving portion 220 and fixed at the housing 310.

At least one portion of the housing 310 may be formed in a shape corresponding to an inner circumferential surface of the cover member 100. Particularly, an outer circumferential surface of housing 310 may be formed with a shape corresponding to an inner circumferential surface of the lateral plate 102 of the cover member 100. The housing 310 may take a cubic shape including four lateral surfaces. However, the housing 310 may take any shape as long as the housing 310 can be housed in the cover member 100. The housing 310 may be formed in an injection-molded article in consideration of productivity.

The housing 310 may be disposed at an upper side of the base 500. The housing 310 is a portion that is moved GIS driving and may be spaced apart from the cover member 100 at a predetermined interval. However, the housing 310 may be fixed on the base 500 in the AF model. Alternatively, the housing 310 may be omitted in the AF model and the second driving portion 320 may be fixed on the cover member 100.

An upper surface of housing 310 may be coupled with the upper support member 610.

The housing 310 may include an inner space 311, a second driving portion coupling portion 312 and an upper coupling portion 313.

The housing 310 may be opened at an upper side and a lower side to allow the first driving portion 200 to vertically move. The housing 310 may be formed at an inside with an upper/bottom-opened inner space 311. The bobbin 210 may be movably disposed in the inner space 311. That is, the through hole 311 may be formed in a shape corresponding to that of the bobbin 210. Furthermore, an inner circumferential surface of the housing 310 forming the inner space 311 may be spaced apart from an outer circumferential surface of bobbin 210.

The housing 310 may include, at a lateral surface, a second driving portion coupling portion 312 formed in a shape corresponding to that of the second driving portion 320 to accommodate the second driving portion 320. That is, the second driving portion coupling portion 312 may accommodate the second driving; portion 320 and fix the second driving portion 320. The second driving portion 320 may be fixed to the second driving portion coupling portion 312 using an adhesive (not shown). Meantime, the second driving portion coupling portion 312 may be disposed at an inner circumferential surface of housing 310. In this case, this structural configuration may provide an advantageous electromagnetic interaction with the first driving portion 220 disposed at an inside of the second driving portion 320. Furthermore, the second driving portion coupling portion 312 may take a bottom-opened shape, for example. In this case, an advantageous electromagnetic interaction may be implemented between a third driving portion 420 disposed at a lower side of the second driving portion 320 and the second driving portion 320. The second driving portion coupling portion 312 may be formed in a four pieces, for example. Each of the four second driving portion coupling portion 312 may be coupled with the second driving portion 320. Meantime, the second driving portion coupling portion 312 may be formed at a corner portion meeting a lateral surface adjacent to the housing 310. Alternatively, the second driving portion coupling portion 312 may be formed at a lateral surface of the housing 310.

The housing 310 may include an upper coupling portion 313 coupled to the upper support member 610. The upper coupling portion 313 may be coupled to an external portion 611 of the upper support member 610. For example, a lug of the upper coupling portion 313 may be coupled to a groove or a hole of the external portion 611 of the upper support member 610 by being inserted into the groove or the hole. At this time, the lug of the upper coupling portion 313 may be fused while being inserted into the hole of the external portion 611 to fix the upper support member 610.

The housing 310 may include an upper stopper 315 protruded from one surface of the housing 310. The housing 310 may include an upper stopper 315 protruded from an upper surface to an upper side. The upper stopper 316 may be upwardly protruded from the housing 310. The upper stopper 316 may be overlapped with the cover member 100 in a vertical direction. When the housing 310 moves upwardly through this structure, the upper stopper 316 and the cover member 100 become contacted to restrict the movement of housing 310. That is, the upper stopper 316 may restrict a movement limitation because of mechanical structure of housing 310.

The second driving portion 320 may be disposed to face the first driving portion 220. The second driving portion 320 may move the first driving portion 220 through an electromagnetic interaction with the first driving portion 220. The second driving portion 320 may include a magnet portion. At this time, the second driving portion 320 is a magnet portion for driving, and may be called a "driving magnet portion". The driving magnet portion may be disposed at the housing 310. The driving magnet portion may be fixed to the second driving portion coupling portion 312. As an example, as shown in FIG. 2, the driving magnet portion may be disposed at the housing 310 by being independently formed with four magnets to allow forming a 90° between adjacent two magnets. That is, the driving magnet portion can promote an efficient use of inner volume through the magnets mounted at an equidistant interval on four lateral surfaces of the housing 310. However, the embodiment is not limited thereto. Meantime, as explained in the foregoing discussion, the first driving portion 220 may include the magnet portion and the second driving portion 320 may include a coil portion.

The stator 300 may be disposed at a lower side of second mover 300. The stator 300 may face the second mover 300. The stator 300 may movably support the second mover 300. The stator 300 may move the second mover 300. At this time, the first mover 200 may also move along with the second mover 300. Furthermore, the stator 300 may be centrally disposed with through holes 411 and 412 corresponding to the lens module.

The stator 300 may include a driving substrate 410 and a third driving portion 420. The stator 300 may include a driving substrate 410 interposed between the third driving portion 420 and the base 500, Furthermore, the stator 300 may include, at a lower side of the second driving portion 320, a third driving portion 420 to face the second driving portion 320.

The driving substrate 410 may include an FPCB which is a flexible Printed Circuit Board. The driving substrate 410 may be interposed between the base 500 and the housing 310. The driving substrate 410 may be interposed between the third driving portion 420 and the base 500. The driving substrate 410 may supply a power to the third driving portion 420. The driving substrate 410 may supply a power to the first driving portion 220 and the third dtiving portion 320. The driving substrate 410 may supply a power to an AF coil portion through the lateral support member 630 and the upper support member 610. Furthermore, the substrate 410 may supply a power to an AF sensor portion (not shown) through the lateral support member 630 and the upper support member 610.

The driving substrate 410 may include, for example, a through hole 411 and a terminal portion 412. The substrate 410 may include a through hole 411 through which the light passing through the lens module passes. The substrate 410 may include a terminal portion 412 downwardly bent and exposed to an outside. At least a portion of the terminal portion 412 may be exposed to the outside to be connected to an external power source, and power may be supplied to the driving substrate 410 through this.

The third driving portion 420 may move the second driving portion 320 through electromagnetic interaction. The third driving portion 420 may include a coil portion. Preferably, the third driving portion 420 may include a coil substrate. In this case, the third driving portion 420 may be referred to as an ON coil substrate (Optical image Stabilization coil substrate). Also, the third driving portion 420 may be referred to as a 'second coil portion' in order to be distinguished from the first coil portion. Of course, the coil portion of the third driving portion 420 may be referred to as a first coil portion, and the coil portion of the first driving portion 220 may be referred to as a second coil portion. The OIS coil substrate may be positioned on the driving substrate 410. The OIS coil substrate may be positioned between the base 500 and the housing 310. The OIS coil substrate may face the driving magnet portion. When power is applied to the OIS coil substrate, the second driving portion 320 and the housing 310 to which the second driving portion 320 is fixed may move integrally due to the interaction between the OIS coil substrate and the driving magnet portion. The OIS coil substrate may be formed of a fine pattern coil (FP coil) mounted on an insulating layer.

On the other hand, it may be effective in terms of miniaturization of the camera module (lowering the height in the z-axis direction, which is the optical axis direction). The OIS coil substrate, for example, may be formed to minimize interference with the OIS sensor portion 700 positioned on a lower side. The OIS coil substrate may be positioned so as not to overlap the OIS sensor portion 700 in the vertical direction.

The OIS coil substrate may include first to fourth coil units 422, 423, 424, and 425. The first coil unit 422 may be positioned at a first corner portion 506 of the base 500. The second coil unit 42.3 may be positioned at a third corner portion 505 of the base 500. The third coil unit 424 may be positioned at a second corner portion 508 of the base 500. The fourth coil unit 425 may be positioned at a fourth corner portion 507 of the base 500. In this case, each of the first to fourth coil units 422, 423, 424, and 425 according to the first embodiment may include an insulating layer separated from each other and a coil pattern disposed on the insulating layer. In addition, alternatively, the first to fourth coil units 422, 423, 424, and 425 according to a second embodiment may include one substrate with a through hole 421 formed in a center while being connected to each other and four coil patterns respectively disposed at corners of the one substrate. In addition, the first to fourth coil units 422, 423, 424, and 425 may include coil patterns disposed on two or three insulating layers, respectively. This will be described in detail below.

The first and second coil units 422 and 423 may be positioned diagonally as shown in FIG. 3A. In addition, the third and fourth coil units 424 and 425 may be positioned diagonally as shown in FIG. 3A, As an example, the first coil unit 422, the second coil unit 423, the third coil unit 424, and the fourth coil unit 425 may be sequentially arranged in a counterclockwise as shown in FIG. 3A.

Meanwhile, as described above, each of the first to fourth coil units 422, 423, 424, and 425 in the first embodiment may include an insulating layer separated from each other and a coil pattern disposed on the insulating layer.

Also, the first to fourth coil units 422, 423, 424, and 425 may be disposed on the driving substrate 410. In this case, each of the first to fourth coil units 422, 423, 424, and 425 according to the first embodiment includes a coil pattern portion disposed on an insulating layer separated from each other. In addition, the first to fourth coil units 422, 423, 424, and 425 may be disposed on the driving substrate 410 to be spaced apart from each other by a predetermined interval. Accordingly, an open region may be provided between the first to fourth coil units 422, 423, 424, and 425.

That is, as shown in FIGS. 3A and 3B, a first open region 426 may be formed between the first coil unit 422 and the second coil unit 423. Also, a second open region 427 may be formed between the second coil unit 423 and the third coil unit 424. Also, a third open region 428 may be formed between the third coil unit 424 and the fourth coil unit 425. Also, a fourth open region 429 may be formed between the first coil unit 422 and the fourth coil unit 425.

In this case, when the driving substrate 410 and the first to fourth coil units 422, 423, 424, and 425 are coupled, each of the first to fourth open regions 426, 427, 428, and 429 may expose a portion of an upper surface of the driving substrate 410. In addition, a device may be mounted on an upper surface region of the driving substrate 410 exposed through the first to fourth open regions 426, 427, 428, and 429.

That is, a first device 413 may be mounted on a first upper surface of the driving substrate 410 corresponding to the first open region 426. Also, a second device 414 may be mounted on a second upper surface of the driving substrate 410 corresponding to the second open region 427. Also, a third device 415 may be mounted on a third upper surface of the driving substrate 410 corresponding to the third open region 428. In addition, a fourth device 416 may be mounted on a fourth upper surface of the driving substrate 410 corresponding to the fourth open region 429. Here, the first to fourth upper surfaces corresponding to the first to fourth open regions 426, 427, 428 and 429 may refer to a region aligned (or overlapping) with the first to fourth open regions 426, 427, 428, and 429 in the optical axis direction among the upper surface of the driving substrate 410. The first to fourth devices 413, 414, 415, and 416 may be passive devices or active devices. For example, the first to fourth devices 413, 414, 415, 416 may be a part of a controller (not shown) for controlling the overall operation of the camera module in the embodiment, and a part of the controller of the embodiment may be disposed on the stator of the camera module.

Accordingly, in the embodiment, it is not necessary to provide a separate substrate for mounting the first to fourth devices 413, 414, 415, and 416, and the overall size of the camera module can be reduced by disposing the first to fourth devices 413, 414, 415, and 416 in the first to fourth open regions 426, 427, 428, 429.

On the other hand, the coil substrate of a conventional camera module includes a coil pattern corresponding to the first to fourth coil units while being formed in each of the four corners of one insulating layer. In this case, a pad connected to the coil pattern and having a function of inputting or outputting a current is disposed in a region (eg, a bridge part) on which the coil pattern is not disposed on the upper surface of the one insulating layer. Accordingly, the device in the conventional camera module had to be mounted on a separate substrate except for the upper surface of the driving substrate and the coil substrate, and thus the overall thickness of the camera module was increased.

To this end, the coil substrate in the embodiment includes a plurality of coil units as four separate substrates, and an open region between the plurality of coil units can be utilized as a device mounting space.

In addition, as shown in FIG. 3C, each of the first coil unit 422, the second coil unit 423, the third coil unit 424, and the fourth coil unit 425 includes an insulating layer 810, a first coil pattern portion 820 disposed on one surface of the insulating layer 810 and a second coil pattern portion 830 disposed on the other surface of the insulating layer 810, This will be described in more detail below.

A vertical distance (optical axis direction) between the driving magnet portion and the OIS coil substrate may be 100 μm. Furthermore, a vertical distance may be 80~120 μm. The distance between the driving magnet portion and the OIS coil substrate affects an electromagnetic interaction between the driving magnet portion and the OIS coil substrate, such that the electromagnetic interaction for OIS driving can be secured by reducing a distance between the driving magnet portion and the OIS coil substrate even if the number of winding on the OIS coil is reduced according to the present exemplary embodiment.

The third driving portion 420 may be disposed with a through hole 421 through which a light of the lens module can pass. The through hole 421 may have a diameter corresponding to that of the lens module. The through hole 421 of third driving portion 420 may have a diameter corresponding to that of the through hole 411 of the driving substrate 410. The through hole 421 of the third driving portion 420 may have a diameter corresponding to that of a through hole 510 of the base 500. The through hole may have a round shape, for example. However, the embodiment is not limited thereto.

The base 500 may be disposed at a lower side of the bobbin 210. The base 500 may be disposed at a lower side of the housing 310. The base 500 may support the second mover 300. A PCB may be disposed at a lower side of the base 500. The base 500 may perform a sensor holder function protecting an image sensor mounted on the PCB.

The base 500 may include a through hole 510, an extension portion 520, a sensor mounting portion 530 and a foreign object collection portion (not shown). The base 500 may include a through hole 510 formed at a position corresponding to that of lens receptor portion 211 at the bobbin 210. Meantime, the through hole 510 of base 500 may be coupled with an IR (Infrared Ray) filter. However, the IR filter may be coupled to a separate sensor holder disposed at a lower surface of the base 500.

The base 500 may include an extension portion 520 extended from an upper surface to an upper side. The extension portion 520 may be upwardly protruded from an upper surface of the base 500. The extension portion 520 may be disposed at a first corner portion 505. The extension portion 520 may include first to fourth lugs respectively formed at first to fourth corner portions 505, 506, 507, and 508 of base 500. An outer circumferential surface of the housing 310 may be formed with first to fourth grooves respectively corresponding to the first to fourth lugs. The first to fourth grooves may be accommodated by the first to fourth lugs in pairs. That is, at least one portion of the housing 310 may be disposed at an inside of the extension portion 520. Through this structure, a movement of the housing 310 may be restricted to a horizontal direction (a direction perpendicular to an optical axis direction). That is, the extension portion 520 of the base 500 may function as a stopper relative to a lateral movement of the housing 310.

A damper (not shown) may be interposed between the extension portion 520 of the base 500 and the housing 310. The damper may inhibit a resonant phenomenon that may be generated from auto focus feedback control and/or the OIS feedback control.

The base 500 may include a sensor mounting portion 530 coupled by the OIS sensor portion 700. That is, the OIS sensor portion 700 may be mounted on the sensor mounting portion 530. At this time, the OIS sensor portion 700 may detect the horizontal movement or tilt of housing 310 by detecting the second driving portion 320 coupled to the housing 310. The sensor mounting portion 530 may be formed in two pieces, for example. Each of the two sensor mounting portions 530 may be disposed with the OIS sensor portion 700. The OIS sensor portion 700 may include a first axis sensor 710 and a second axis sensor 720 so arranged as to detect both the x axis and y axis directional movements of the housing 310.

The base 500 may include a foreign object collection portion collecting foreign object introduced inside of the cover member 100. The foreign object collection portion may be disposed at an upper surface of the base 500 and includes an adhesive material to collect a foreign object in an inside space formed by the cover member 100 and the base 500.

The base 500 may include first to fourth lateral surfaces 501, 502, 503, and 504 each sequentially and adjacently arranged. That is, the first lateral surface 501 may be adjacently formed to the second and fourth lateral surfaces 502 and 504. The second lateral surface 502 may be adjacently formed to first and third lateral surfaces 501 and 503. The third lateral surface 503 may be adjacently formed to the second and fourth lateral surfaces 502 and 504. The fourth lateral surface 504 may be adjacently formed to the third and first lateral surfaces 503 and 501. The base 500 may include first to fourth corner portions 505, 506, 507, and 508 disposed between the first to fourth lateral surfaces 501, 502, 503, and 504. That is, the first corner portion 505 may be disposed between the first and second lateral surfaces 501 and 502. The second corner portion 506 may be disposed between the second and third lateral surfaces 502 and 503. The third corner portion 507 may be disposed between the third and fourth lateral surfaces 503 and 504. The fourth corner portion 508 may be disposed between the fourth and first lateral surfaces 504, 501.

The support member 600 may connect any of two or more of the first mover 200, the second mover 300, the stator 300 and the base 500. The support member 600 may elastically connect any of two or more of the first mover 200, the second mover 300, the stator 300 and the base 500 to support a relative movement between each element. The support member 600 may be so formed as to have elasticity on at least one portion thereof. In this case, the support member 600 may be called an elastic member or a spring.

The support member 600 may include an upper support member 610 and a lateral support member 630, for example. At this time, the upper support member 610 may be called an 'auto focus spring', an 'AF elastic member' and the like. Furthermore, the lateral support member 630 may be called an 'OIS spring', an 'OIS elastic member' and the like. Furthermore, the support member 600 may further include a lower support member (not shown), for example.

The upper support member 610 may be coupled to the bobbin 210 and the housing 310. The upper support member 610 may elastically support the bobbin 210 relative to the housing 310. The upper support member 610 may include an outer portion 611, an inner portion 612 and a connecting portion 613, for example. The upper support member 610 may include an outer portion 611 coupled with the housing 310, an inner portion 612 coupled with the bobbin 210, and a connecting portion 613 elastically connecting the outer portion 611 and the inner portion 612.

The upper support member 610 may be connected to an upper surface of the first mover 200 and to an upper surface of the second mover 300. To be more specific, the upper support member 610 may be coupled an upper surface of bobbin 210 and to an upper surface of housing 310. The inner portion 612 of upper support member 610 may be coupled to an upper coupling portion 213 of bobbin 210, and the outer portion 611 of upper support member 610 may be coupled to an upper coupling portion 313 of the housing 310.

The upper support member 610 may be separated to a pair to be used for supply of an electric power to an AF coil portion and the like. The upper support member 610 may include a first upper support unit 614 and a second upper support unit 615, each spaced apart from the other. The first upper support unit 614 may be electrically connected to one end of the AF coil portion, and the second upper support unit 615 may be electrically connected to the other end of the AF coil portion. The upper support member 610 can supply a power to the AF coil portion through this structure. The upper support member 610 may receive the power from the substrate 410 through the lateral support member 630. The upper support member 610 may be disposed by being separated into six (6) pieces, for example. At this time, four of the six upper support member 610 may be electrically conducted to the AF sensor portion, and the remaining two may be electrically conducted to the AF coil portion.

The lower support member may include an outer portion, an inner portion and a connecting portion. The lower support member may include an outer portion coupled with the housing 310, an inner portion coupled with the bobbin 210 and a connecting portion elastically connecting the outer portion and the inner portion. The lower support member may be integrally formed. However, the embodiment is not limited thereto. In a modification, the lower support member may be divided into a pair for use of power supply to the AF coil portion and the like.

The lateral support member 630 may be coupled to the base 500 and the housing 310. The lateral support member 630 may elastically support the housing 310 relative to the base 5000. The lateral support member 630 may be coupled at one side to the stator 300 and/or to the base 500, and may be coupled to the upper support member 610 and/or to the housing 310 at the other side. The lateral support member 630 may be coupled to the base 500 at one side and may be coupled to the housing 310 at the other side, for example. Furthermore, the lateral support member 630 in another exemplary embodiment may be coupled to the stator 300 at one side and may be coupled to the upper support member 610 at the other side. Through this structure, the lateral support member 630 may elastically support the second mover 300 relative to the stator 300 to allow the second mover 300 to move horizontally or tilt. The lateral support member 630 may include a leaf spring, for example. Alternatively, the lateral support member 630 may include a plurality of wires as a modification. Meantime, the lateral support member 630 may be integrally formed with the upper support member 610.

The lateral support member 630 may include a lower portion 631, an upper portion 632, a connecting portion 633. The lateral support member 630 may include a lower portion 631 coupled to the base 500. The lateral support member 630 may include an upper portion 632 coupled to the housing 310. The lateral support member 630 may include a connecting portion 633 connecting the lower coupling portion 631 and the upper coupling portion 632.

Hereinafter, the OIS coil substrate 420 according to the embodiment will be described in detail. The OIS coil substrate 420 to be described below may be equally used for a substrate on which the AF coil is mounted, and accordingly, it will be described as a 'coil substrate 420'.

The coil substrate 420 in the first embodiment may include four independent coil units. For example, the coil substrate 420 may include first to fourth coil units 422, 423, 424, and 425 respectively disposed at four corners of the driving substrate 410.

In addition, each of the first to fourth coil units 422, 423, 424, and 425 may include an insulating layer and a coil pattern disposed on each of upper and lower surfaces of the insulating layer. In this case, the respective insulating layers forming the respective coil units are separated from each other. Accordingly, the embodiment may configure the driving portion for the OIS operation by manufacturing a plurality of coil units and arranging the plurality of coil units thus manufactured in the respective corners of the driving substrate 410.

Also, the coil substrate 420 according to another embodiment may include one insulating layer and a coil pattern disposed on upper and lower surfaces of four corners of the insulating layer. That is, the coil substrate 420 according to another embodiment may configure the driving portion for OIS operation by mutually manufacturing four coil units on one insulating layer and thus arranging the mutually manufactured coil substrate on the driving substrate 410.

Figure 4:
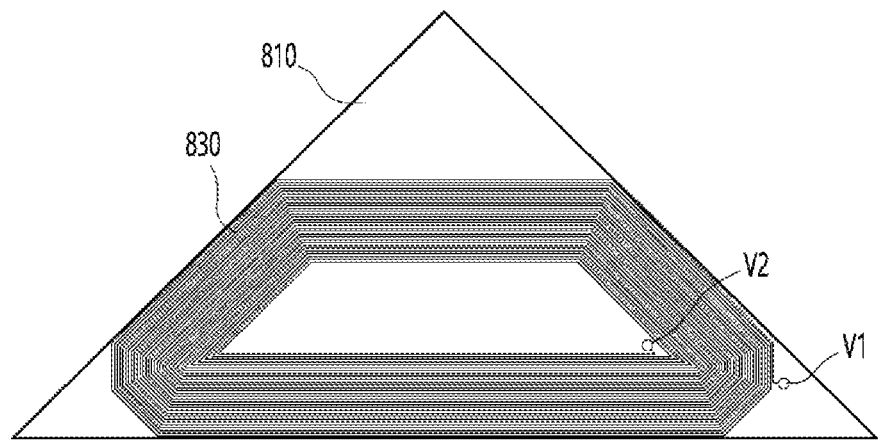
FIG. 4 is a top view of a coil substrate according to a first embodiment.
Figure 5:
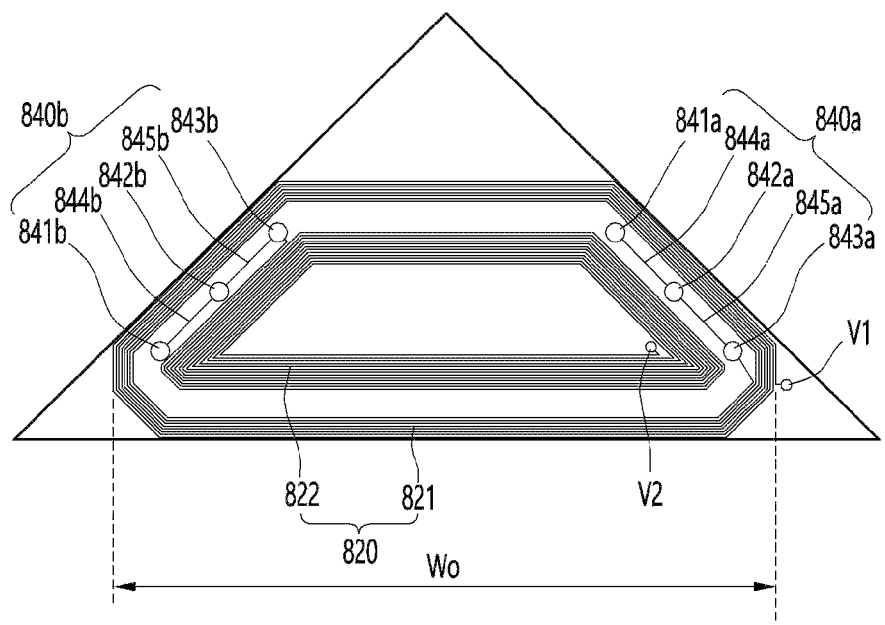
FIG. 5 is a bottom view of a coil substrate according to a first embodiment.

FIG. 4 is a top view of a coil substrate according to a first embodiment, and FIG. 5 is a bottom view of a coil substrate according to a first embodiment.

Referring to FIGS. 4 and 5, the coil substrate 420 may include four coil units respectively disposed at four corners as described above. In addition, the four coil units may include an insulating layer 810, a first coil pattern portion 820 disposed on a lower surface of the insulating layer 810, and a second coil pattern portion 830 disposed on an upper surface of the insulating layer 820, and pad portions 840a and 840b disposed on a lower surface of the insulating layer 810 and spaced apart from the first coil pattern portion 820 by a predetermined interval.

The insulating layer 810 may have a shape corresponding to a corner portion of the driving substrate 410. For example, the insulating layer 810 may have a triangular planar shape. However, the embodiment is not limited thereto, and the insulating layer 810 may be deformable into a rectangular shape, a circular shape, a polygonal shape, and an elliptical shape, which may be disposed at the corner of the driving substrate 410.

The insulating layer 810 may include polyimide (PI). However, the embodiment is not limited thereto, and the insulating layer 810 may be formed of a polymer material such as polyethylene terephthalate (PET) or polyethylene naphthalate (PEN). Accordingly, the driving substrate 410 including the insulating layer 810 may be used in various electronic devices provided with curved display devices.

The insulating layer 810 may be referred to as an insulating substrate or a supporting substrate for supporting and insulating the first coil pattern portion 820, the second coil pattern portion 830, and the pad portions 840a and 840b.

The insulating layer 810 may have a thickness of 20 μm to 100 μm. For example, the insulating layer 810 may have a thickness of 25 μm to 50 μm. For example, the insulating layer 810 may have a thickness of 30 μm to 40 μm. When the thickness of the insulating layer 810 exceeds 100 μm, the overall thickness of the coil substrate may increase. In addition, when the thickness of the insulating layer 810 is less than 20 μm, a problem of being vulnerable to heat/pressure may occur in the process of forming the first coil pattern portion 820 or the second coil pattern portion 830 on the insulating layer 810.

The first coil pattern portion 820 may be disposed on the lower surface of the insulating layer 810. Preferably, the first coil pattern portion 820 may be disposed on a lower surface of the insulating layer 810 facing the driving substrate 410.

In addition, the second coil pattern portion 830 may be disposed on the upper surface of the insulating layer 810. Preferably, the second coil pattern portion 830 may be disposed on the upper surface of the insulating layer 810 facing the lower surface of the insulating layer 810 on which the first coil pattern portion 820 is disposed.

The first coil pattern portion 820 and the second coil pattern portion 830 may be wound in one direction while having a plurality of bent regions on the upper and lower surfaces of the insulating layer 810, respectively. Accordingly, each of the first coil pattern portion 820 and the second coil pattern portion 830 may have a coil shape as a whole. For example, the first coil pattern portion 820 and the second coil pattern portion 830 may have a coil shape while being wound in one direction from the outside to the inside or from the inside to the outside.

In this case, a winding direction of the first coil pattern portion 820 may be the same as a winding direction of the second coil pattern portion 830. For example, the first coil pattern portion 820 may be wound in a clockwise direction from the inside to the outside. Also, the second coil pattern portion 830 may be wound from the inside to the outside in the same manner as the first coil pattern portion 820 in a clockwise direction. Accordingly, the embodiment may simplify the process of forming the coil pattern on the insulating layer 810 by the first coil pattern portion 820 and the second coil pattern portion 830 being both wound in the same direction and formed.

However, the direction of the current flowing through the first coil pattern portion 820 may be different from the direction of the current flowing through the second coil pattern portion 830. Preferably, the direction of the current flowing through the first coil pattern portion 820 may be opposite to the direction of the current flowing through the second coil pattern portion 830.

The second coil pattern portion 830 has a shape corresponding to the shape of the insulating layer 810 and may be disposed on the upper surface of the insulating layer 810. For example, the second coil pattern portion 830 may have a trapezoidal shape including a region parallel to three lateral sides of the insulating layer 810. However, the embodiment is not limited thereto, and the second coil pattern portion 830 may have a triangular or circular shape, and may be disposed on the insulating layer 810. On the other hand, the number of turns of the second coil pattern portion 830 and the first coil pattern portion 820 should be increased to maximize the Lorentz force in a limited space, and accordingly, each of the second coil pattern portion 830 and the first coil pattern portion 820 may be disposed to have a shape corresponding to the planar shape of the insulating layer 810.

The first coil pattern portion $20 and the second coil pattern portion 830 may be formed of a metal material including copper (Cu). However, the embodiment is not limited thereto, and the first coil pattern portion 820 and the second coil pattern portion 830 may include at least one of copper (Cu), aluminum (Al), chromium (Cr), nickel (Ni), and silver. (Ag), molybdenum (Mo), gold (Au), titanium (Ti), and alloys thereof. Meanwhile, although not shown in the drawing, a surface treatment layer (not shown) may be disposed on the surfaces of the first coil pattern portion 820 and the second coil pattern portion 830. The surface treatment layer may include tin (Sn) having excellent corrosion resistance. The surface treatment layer may prevent oxidation of the first coil pattern portion 820 and the second coil pattern portion 830, thereby improving the reliability of the coil substrate.

The first coil pattern portion 820 and the second coil pattern portion 830 generate an electromotive force by changing magnetic flux due to a change in current. The magnetic flux generated in the first coil pattern portion 820 and the second coil pattern portion 830 may be proportional to the inductance and the flowing current as shown in following equations. In addition, the electromotive force may be affected by the resistance of a circuit, and the resistance may be reduced as a cross-sectional areas of the first coil pattern portion 820 and the second coil pattern portion 830 increase.

$$\Phi = L1 \qquad \text{[Equation 1]}$$

$$L = (\mu N2A)/1 \qquad \text{[Equation 2]}$$

$$\text{Resistance} = 1/(\text{conductivity})*A \qquad \text{[Equation 3]}$$

(In Equations 1 to 3, Φ is magnetic flux, L is inductance, N is the number of turns of the coil pattern portion, 1 is the length of a coil, and A is an area (line width*thickness of the coil pattern portion).)

That is, the cross-sectional areas of the first coil pattern portion 820 and the second coil pattern portion 830 should be increased to reduce the resistance of the circuit, and the line width and thickness of the first coil pattern portion 820 and the second coil pattern portion 830 should be increased to increase the cross-sectional areas of the first coil pattern portion 820 and the second coil pattern portion 830.

Meanwhile, the first coil pattern portion 820 and the second coil pattern portion 830 may be formed to a predetermined thickness between photosensitive patterns through an electrolytic or electroless plating process after forming the photosensitive patterns formed of a photosensitive film on the insulating layer 810.

Meanwhile, each of the first coil pattern portion 820 and the second coil pattern portion 830 may have a thickness of 20 μm to 60 μm and may be respectively disposed on the upper and lower surfaces of the insulating layer 810. In detail, the first coil pattern portion 820 and the second coil pattern portion 830 may be disposed to have a thickness of 30 μm to 50 μm. In more detail, the first coil pattern portion 820 and the second coil pattern portion 830 may be disposed to have a thickness of 35 μm to 45 μm.

When the thickness of the first coil pattern portion 820 and the second coil pattern portion 830 is less than 20 μm, the resistance of the first coil pattern portion 820 and the second coil pattern portion 830 may increase. When the thickness of the first coil pattern portion 820 and the second coil pattern portion 830 exceeds 60 µm, it may be difficult to implement a fine pattern.

In addition, each of the first coil pattern portion 820 and the second coil pattern portion 830 may have a line width of 10 µm to 30 µm. In detail, the first coil pattern portion 820 and the second coil pattern portion 830 may have a line width of 12 µm to 27 µm. In more detail, the first coil pattern portion 820 and the second coil pattern portion 830 may have a line width of 15 µm to 25 µm.

When the line width of the first coil pattern portion 820 and the second coil pattern portion 830 are less than 10 µm, the resistance of the first coil pattern portion 820 and the second coil pattern portion 830 may increase. When the line width of the first coil pattern portion 820 and the second coil pattern portion 830 exceeds 30 µm, it may be difficult to implement a fine pattern.

In addition, each of the first coil pattern portion 820 and the second coil pattern portion 830 may be wound in one direction while being spaced apart from each other by an interval of 5 µm to 15 µm. In detail, each of the first coil pattern portion 820 and the second coil pattern portion 830 may be disposed at an interval of 7 µm to 13 µm. In more detail, each of the first coil pattern portion 820 and the second coil pattern portion 830 may be disposed at an interval of 9 µm to 11 µm.

When the interval of each of the first coil pattern portion 820 and the second coil pattern portion 830 is less than 5 µm, the photosensitive pattern collapses and a short occurs due to the reduction in the line width of the photosensitive pattern in the process of forming the first coil pattern portion 820 and the second coil pattern portion 830, and accordingly, the line width of each of the coil pattern portions may become non-uniform. In addition, when the interval of each of the first coil pattern portion 820 and the second coil pattern portion 830 exceeds 15 µm, the line length of each of the first coil pattern portion 820 and the second coil pattern portion 830 may be increased as a whole.

Meanwhile, the first coil pattern portion 820 and the second coil pattern portion 830 may be electrically connected to each other through vias V1 and V2.

Specifically, the first coil pattern portion 820 includes an outer coil pattern portion 821 and an inner coil pattern portion 822.

The inner coil pattern portion 822 may be wound around a central region of the lower surface of the insulating layer 810 by a predetermined number of times.

The inner side of the outer coil pattern portion 821 is spaced apart from an outer side of the inner coil pattern portion 822 by a predetermined interval, and accordingly, it may be wound around the inner coil pattern portion 822 by a predetermined number of times at a position spaced apart by a predetermined interval.

In this case, the inner coil pattern portion 822 and the outer coil pattern portion 821 are not directly connected to each other. Here, the non-direct connection means that the current flowing from the inner coil pattern portion 822 is transmitted to the outer coil pattern portion 821, but the current is not directly supplied from the inner coil pattern portion 822 to the outer coil pattern portion 821, or from the outer coil pattern portion 821 to the inner coil pattern portion 822.

Meanwhile, pad portions 840a and 840b are disposed on the lower surface of the insulating layer 810.

That is, the pad portions 840a and 840b may be disposed in a region between the inner coil pattern portion 822 and the outer coil pattern portion 821. For example, the pad portions 840a and 840b may be positioned between an outer side of the inner coil pattern portion 822 and an inner side of the outer coil pattern portion 821.

Accordingly, the inner coil pattern portion 822 may be positioned inside a region in which the pad portions 840a and 840b are formed among the lower surfaces of the insulating layer 810, and the outer coil pattern portion 821 may be positioned outside the region in which the pad portions 840a and 840b are formed on the lower surface of the insulating layer 810.

That is, the coil substrate 420 in the embodiment should be electrically connected to the driving substrate 410. Accordingly, a pad portion should be formed on the coil substrate 420 in order to be electrically connected to the driving substrate 410 and receive current from the driving substrate 410.

Accordingly, a space for forming the pad portions 840a and 840b electrically connected to the driving substrate 410 must be provided at the lower surface of the insulating layer 810. In this case, when the insulating layer 810 is formed in multiple layers, an additional layer on which the pad portions 840a and 840b are formed may be provided, but there is a problem in that the thickness of the coil substrate increases.

In addition, when the coil pattern and the pad portions 840a and 840b are disposed together on a single layer, the number of rotations of the coil pattern (or the length of the coil pattern or the area of arrangement of the coil pattern) decreases by the region of arrangement of the pad portions 840a and 840b, and thus the Lorentz force decreases.

Therefore, the embodiment makes it is possible to form a coil pattern for generating the maximum Lorentz force in a limited space.

That is, the Lorentz force generated by the coil pattern may increase or decrease in proportion to the size of an outer width Wo of the coil pattern. In the drawings, the outer width Wo is defined as the width of the coil pattern in the horizontal direction, but this is only an example and the outer width Wo may be defined as the width of the coil pattern in the vertical direction Accordingly, the outer width Wo of the first coil pattern portion 820 positioned below the insulating layer 810 may be determined according to the positions of the pad portions 840a and 840b, and the strength of the Lorentz force generated in the first coil pattern portion 820 may be determined according to the outer width Wo.

Figure 6A:
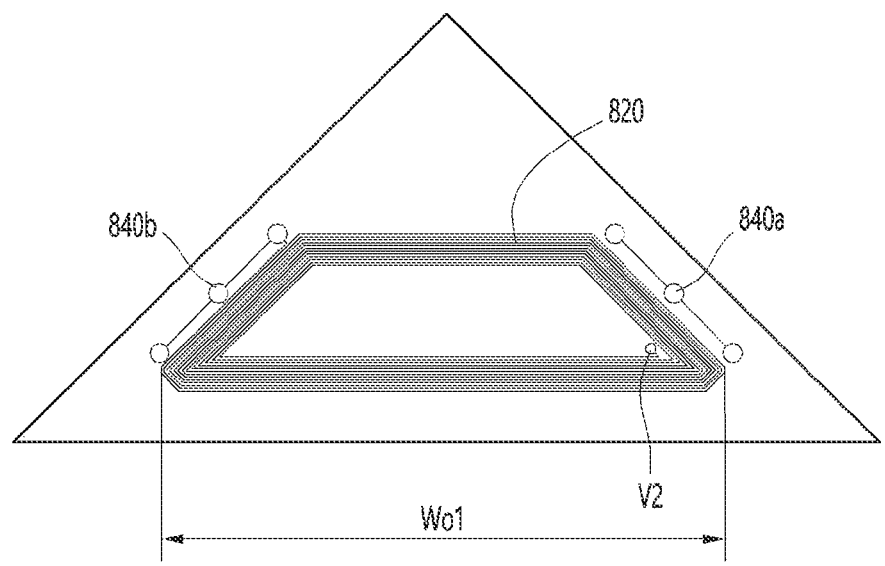
FIGS. 6A and 6B are views for explaining an arrangement example of a first coil pattern portion according to a comparative example.
Figure 6B:
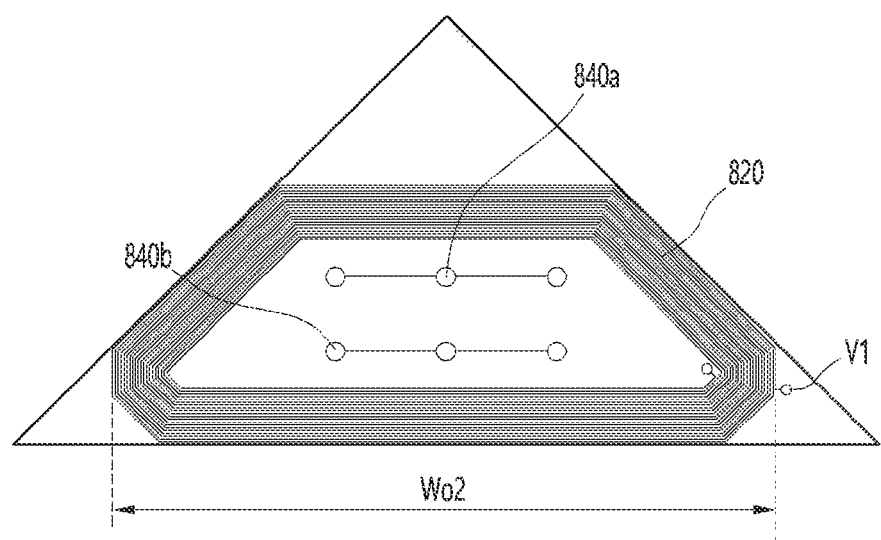

FIGS. 6A and 6B are views for explaining an arrangement example of a first coil pattern portion according to a comparative example.

At this time, as shown in FIG. 6A, when the pad portions 840a and 840b are disposed in the outer region of the lower surface of the insulating layer 810 and the first coil pattern portion 820 corresponding to the inner coil pattern portion of the present embodiment is only disposed inside the pad portions 840a and 840b, the number of rotations and the outer width Vol of the inner coil pattern portion decrease by the region in which the pad portions 840a and 840b are disposed. That is, as shown in FIG. 6A, the width Vol between the outermost sides of the coil pattern may be reduced by the pad arrangement region compared to the present embodiment, and the Lorentz force decreases by the difference.

Alternatively, as shown in FIG. 6B, the pad portion is disposed on the inside of the lower surface of the insulating layer 810, and accordingly, the outer coil portion surrounding the pad portions 840a and 840b may be only disposed on the lower surface of the insulating layer 810. In this case, it may have substantially the same outer width Wo2 as the outer width Wo of the first coil pattern portion 820 in the present embodiment, and a corresponding Lorentz force may be generated.

However, as shown in FIGS. 6A and 6B, the first coil pattern portion disposed on the lower surface of the insulating layer 810 does not entirely overlap the second coil pattern portion disposed on the upper surface in the vertical direction, but only overlaps in the outer region or the inner region. In other words, the first coil pattern portion disposed on the lower surface of the insulating layer 810 may have a structure in which the second coil pattern portion is disposed to be biased inwardly or outwardly in the lower region of the second coil pattern portion.

At this time, as shown in FIG. 6B, when the first coil pattern portion disposed on the lower surface of the insulating layer overlaps only the outer region of the second coil pattern portion disposed on the upper surface of the insulating layer in the vertical direction, the Lorentz force is not uniformly generated in the entire region of the second coil pattern portion, and a concentrated Lorentz force is generated in an outer region of the second coil pattern portion, which may reduce operational reliability for implementing the OIS function. For example, in the case of a structure of FIG. 6B, the Lorentz force may be concentrated to the outer region of the second coil pattern part, and thus the balance with the magnet disposed thereon may be destroyed.

Alternatively, in the embodiment, a uniform Lorentz force may be generated in the inner region and the outer region of the second coil pattern portion 830 by disposing the outer coil pattern portion 821 and the inner coil pattern portion 822 on each of the inner and outer sides of the pad portions 840a and 840b, and accordingly, the reliability of the OIS function can be improved.

Consequently, the first coil pattern portion 820 is disposed on the lower surface of the insulating layer 810, and the second coil pattern portion 830 is disposed on the upper surface of the insulating layer 810.

In this case, the first coil pattern portion 820 includes an inner coil pattern portion 822 and an outer coil pattern portion 821. In addition, the outer coil pattern portion 821 may overlap an outer region of the second coil pattern portion 830 disposed on the upper surface of the insulating layer 810 in a vertical direction (optical axis direction). Also, the inner coil pattern portion 822 may overlap an inner region of the second coil pattern portion 830 disposed on the upper surface of the insulating layer 810 in a vertical direction (optical axis direction).

Meanwhile, the outer width of the first coil pattern portion 820 defined as the outer width of the outer coil pattern portion 821 of the embodiment may be the same as the outer width of the second coil pattern portion 830. In addition, the inner width of the first coil pattern portion 820 defined as the inner width of the inner coil pattern portion 822 of the embodiment may be the same as the inner width of the second coil pattern portion 830. Here, the outer width may correspond to a width in one direction between outermost sides of the coil pattern portion. And, the inner width may correspond to the width in one direction between innermost sides of the coil pattern portion. Accordingly, the outer width and inner width of the first coil pattern portion 820 of the embodiment may be formed to be the same as the outer width and inner width of the second coil pattern portion 830 in a state in which the first pad portion 840a and the second pad portion 840b are disposed and accordingly, operation reliability may be improved.

Meanwhile, pad portions 840a and 840b are disposed on the lower surface of the insulating layer 810. The pad portions 840a and 840b may include a first pad portion 840a and a second pad portion 840b.

The first pad portion 840a and the second pad portion 840b may be connected to the driving substrate 410. In this case, the first pad portion 840a may be a current input pad connected to an input terminal (not shown) of the driving substrate 410. In addition, the second pad portion 840b may be a current output pad connected to an output terminal (not shown) of the driving substrate 410. For example, the first pad portion 840a may be a positive (+) current pad that transmits a positive (+) current. Also, the second pad portion 840b may be a negative (−) current pad that transmits a negative (−) current. Meanwhile, the first pad portion 840a of the embodiment is a current input pad and the second pad portion 840b is a current output pad, but the embodiment is not limited thereto. For example, the first pad portion 840b may function as a current output pad, and the second pad portion 840b may function as a current input pad.

The first pad portion 840a and the second pad portion 840b may be electrically connected to the first coil pattern portion 820.

Specifically, the first pad portion 840a may be directly connected to one end of the outer coil pattern portion 821 of the first coil pattern portion 820. Also, the second pad portion 840b may be directly connected to the other end of the inner coil pattern portion 822 of the first coil pattern portion 820.

That is, the outer coil pattern portion 821 of the first coil pattern portion 820 may be wound in a clockwise direction from the inside to the outside. Accordingly, the outer coil pattern portion 821 may include one end disposed at an innermost side and the other end disposed at an outermost side. In addition, the first pad portion 840a is positioned between the innermost side of the outer coil pattern portion 821 and the outermost side of the inner coil pattern portion 822. Accordingly, the first pad portion 840a may be directly connected to one end positioned adjacent to the first pad portion 840a among one end and the other end of the outer coil pattern portion 821.

Also, the inner coil pattern portion 822 of the first coil pattern portion 820 may be wound in a clockwise direction from the inside to the outside. Accordingly, the inner coil pattern portion 822 may include one end positioned at an innermost side and the other end positioned at an outermost side. In addition, the second pad portion 840b is positioned between the outermost side of the inner coil pattern portion 822 and the innermost side of the outer coil pattern portion 821. Accordingly, the second pad portion 840b may be directly connected to the other end positioned adjacent to the second pad portion 840b among one end and the other end of the inner coil pattern portion 822.

Accordingly, the outer coil pattern portion 821 of the first coil pattern portion 820 may receive the current supplied from the first pad portion 840a through one end. In addition, the inner coil pattern portion 822 of the first coil pattern portion 820 may output a current to the second pad portion 840b through the other end.

Meanwhile, the other end of the outer coil pattern portion 821 is connected to a first via V1. The first via V1 is disposed to pass through the insulating layer 810. The first via V1 may electrically connect between the first coil pattern portion 820 disposed on the lower surface of the insulating layer 810 and the second coil pattern portion 830 disposed on the upper surface of the insulating layer 810.

In addition, one end of the inner coil pattern portion 822 is connected to a second via V2. The second via V2 is disposed to pass through the insulating layer 810. The second via V2 may electrically connect between the first coil pattern portion 820 disposed on the lower surface of the insulating layer 810 and the second coil pattern portion 830 disposed on the upper surface of the insulating layer 810.

The first via V1 and the second via. V2 may be formed by filling an inside of a via hole (not shown) passing through the insulating layer 810 with a conductive material.

When the via hole is formed by mechanical processing, methods such as milling, drilling, and routing may be used, and when the via hole is formed by laser processing, a UV or $CO_2$ laser method may be used, and when the via hole is formed by chemical processing, drugs containing a.minosilane, ketones, etc. may be used, and the like, thereby the insulating layer 810 may be opened.

On the other hand, the processing by the laser is a cutting method that takes the desired shape to melt and evaporate a part of the material by concentrating optical energy on the surface, it can easily process complex formations by computer programs, and can process composite materials that are difficult to cut by other methods.

In addition, the processing by the laser can have a cutting diameter of at least 0.005 mm, and has a wide advantage in a range of possible thicknesses. As the laser processing drill, it is preferable to use a YAG (Yttrium Aluminum Garnet) laser, a $CO_2$ laser, or an ultraviolet (UV) laser. The YAG laser is a laser that can process both the copper foil layer and the insulating layer, and the $CO_2$ laser is a laser that can process only the insulating layer.

When the via hole is formed, the first via V1 and the second via V2 is formed by filling the inside of the via hole with a conductive material. The metal material forming the first via. V1 and the second via V2 may be any one material selected from copper (Cu), silver (Ag), tin (Sn), gold (Au), nickel (Ni), and palladium (Pd), and the conductive material may be filled using any one or a combination of electroless plating, electrolytic plating, screen printing, sputtering, evaporation, inkjetting and dispensing. In addition, the vias can be formed by filling metal materials with electrolytic plating, screen printing, or the like after forming a seed layer through electroless plating with palladium/nickel/chromium, etc. inside the via hole.

Specifically, a lower surface of the first via V1 may be connected to the other end of the outer coil pattern portion 821. Also, an upper surface of the first via V1 may be connected to the other end of the second coil pattern portion 830 disposed on the upper surface of the insulating layer 810.

That is, the second coil pattern portion 830 is formed by winding in a clockwise direction from the inside to the outside. Accordingly, one end of the second coil pattern portion 830 may be positioned at an innermost side, and the other end may be positioned at an outermost side. In addition, the other end positioned at the outermost side of the second coil pattern portion 830 may be connected to the upper surface of the first via V1 formed through the insulating layer 810.

Accordingly, the outer coil pattern portion 821 of the first coil pattern portion 820 and the second coil pattern portion 830 may be electrically connected to each other through the first via V1.

Meanwhile, one end of the inner coil pattern portion 822 of the first coil pattern portion 820 may be connected to the second via V2. Specifically, a lower surface of the second via V2 may be connected to one end of the inner coil pattern portion 822. Also, an upper surface of the second via V2 may be connected to one end of the second coil pattern portion 830 disposed on the upper surface of the insulating layer 810. Accordingly, the second coil pattern portion 830 and the inner coil pattern portion 822 may be electrically connected to each other through the second via V2.

Summarizing the overall structure of the OIS coil portion including the first coil pattern portion 820 and the second coil pattern portion 830 as described above, one end of the outer coil pattern portion 821 of the first coil pattern portion 820 is connected to the first pad portion 840a. In addition, the other end of the outer coil pattern portion 821 of the first coil pattern portion 820 is connected to the lower surface of the first via. V1. In addition, the other end of the second coil pattern portion 830 is connected to the upper surface of the first via V1. In addition, one end of the second coil pattern portion 830 is connected to the upper surface of the second via V2. In addition, one end of the inner coil pattern portion 822 of the first coil pattern portion 820 is connected to a lower surface of the second via V2. In addition, the other end of the inner coil pattern portion 822 of the first coil pattern portion 820 is connected to the second pad portion 840b.

Accordingly, when the first pad portion 840a is a current input pad and the second pad portion 840b is a current output pad, a current input through the first pad portion 840a may flow from one end of the outer coil pattern portion 821 to the other end the outer coil pattern portion 821 in a clockwise direction. In addition, the current provided to the other end of the outer coil pattern portion 821 may be provided to the other end of the second coil pattern portion 830 disposed on the upper surface of the insulating layer 810 through the first via V1. In addition, the current provided to the other end of the second coil pattern portion 830 may flow from the other end of the second coil pattern portion 830 to one end of the second coil pattern portion 830 in a counterclockwise direction. In addition, the current provided to one end of the second coil pattern portion 830 may be provided to one end of the inner coil pattern portion 822 of the first coil pattern portion 820 disposed on the lower surface of the insulating layer 810 through the second via V2. In addition, the current provided to one end of the inner coil pattern portion 822 may flow from one end of the inner coil pattern portion 822 to the other end of the inner coil pattern portion 822 in a clockwise direction. In addition, the current provided to the other end of the inner coil pattern portion 822 may be output through the second pad portion 840b.

Meanwhile, the first pad portion 840a may be a current output pad, and the second pad portion $40b may be a current input pad. And, when the first pad portion 840a is a current output pad and the second pad portion 840b is a current input pad, the current input through the second pad portion 840b may flow from the other end of the inner coil pattern portion 822 to one end of the inner coil pattern portion 822 in a counterclockwise direction. In addition, the current provided to one end of the inner coil pattern portion 822 may be provided to one end of the second coil pattern portion 830 disposed on the upper surface of the insulating layer 810 through the second via V2. In addition, the current provided to one end of the second coil pattern portion 830 may flow from one end of the second coil pattern portion 830 to the other end of the second coil pattern portion 830 in a clockwise direction. In addition, the current provided to the other end of the second coil pattern portion 830 may be provided to the other end of the outer coil pattern portion 821 of the first coil pattern portion 820 disposed on the lower surface of the insulating layer 810 through the first via V1. In addition, the current provided to the other end of the outer coil pattern portion 821 may flow from the other end of the outer coil pattern portion 821 to one end of the outer coil pattern portion 821 in a counterclockwise direction. In addition, the current provided to one end of the outer coil pattern portion 821 may be output through the first pad portion 840*a*.

Through this, the Lorentz force can be maximized by winding the inner coil pattern portion 822 and the outer coil pattern portion 821 of the first coil pattern formed on one surface of the substrate in the same direction and providing a current in the same direction, and the maximum efficiency can be secured only with the two-layer structure.

Meanwhile, the first pad portion 840*a* includes a first-first unit pad 841*a*, a first-second unit pad 842*a*, and a first-third unit pad 843*a*. The first-first unit pad 841*a*, the first-second unit pad, 842*a*, and the first-third unit pad 843*a* may be disposed on the lower surface of the insulating layer 810 to be spaced apart from each other by a predetermined interval.

Also, a connection pattern is disposed between the first-first unit pad 841*a*, the first-second unit pad 842*a*, and the first-third unit pad 843*a* to electrically connect them to each other. For example, a first-first connection pad 844*a* may be positioned between the first-first unit pad 841*a* and the first-second unit pad 842*a*. The first-first connection pad 844*a* may electrically connect between the first-first unit pad 841*a* and the first-second unit pad 842*a*. For example, a first-second connection pad 845*a* may be positioned between the first-second unit pad 842*a* and the first-third unit pad 843*a*. The first-second connection pad 845*a* may electrically connect the first-second unit pad 842*a* and the first-third unit pad 843*a*.

Each of the first-first unit pad 841*a*, the first-second unit pad 842*a*, and the first-third unit pad 843*a* may have a circular shape. Each of the first-first unit pad 841*a*, the first-second unit pad 842*a*, and the first-third unit pad 843*a* may have a diameter of 0.5 mm±0.1 mm, but is not limited thereto.

Operation reliability of the camera module as in the embodiment is determined according to a connection state between the driving substrate 410 and the coil substrate. In this case, the electtical connection between the driving substrate 410 and the coil substrate may be performed by bonding between the first pad portion 840*a* and a first terminal (not shown) formed on the driving substrate 410. In this case, as a contact area between the first pad portion 840*a* and the first terminal increases, the connectivity between the driving substrate 410 and the coil substrate is improved. Therefore, the bonding of the embodiment does not proceed with the first terminal of the driving substrate 410 using only one unit pad, but, as shown in the drawing, the bonding to the first terminal of the driving substrate 410 is performed at a plurality of positions using a plurality of unit pads separated from each other. Accordingly, the embodiment can improve the contact area between the first terminal and the first pad portion 840*a*, as well as increase the design freedom for the position of the terminal of the driving substrate when assembling the module, and accordingly, mutual electrical connectivity may be improved.

Correspondingly, the first pad portion 840*b* includes a second-first unit pad 841*b*, a second-second unit pad 842*b*, and a second-third unit pad 843*b*. The second-second unit pad 841*b*, the second-second unit pad 842*b*, and the second-third unit pad 843*b* may be disposed on the lower surface of the insulating layer 810 to be spaced apart from each other by a predetermined interval.

Also, a connection pattern is disposed between the second-first unit pad 841*b*, the second-second unit pad 842*b*, and the second-third unit pad 843*b* to electrically connect them to each other. For example, a second-first connection pad 844*b* may be positioned between the second-first unit pad 841*b* and the second-second unit pad 842*b*. The second-first connection pad 844*b* may electrically connect the second-first unit pad 841*b* and the second-second unit pad 842*b*. For example, a second-second connection pad 845*b* may be positioned between the second-second unit pad 842*b* and the second-third unit pad 843*b*. The second-second connection pad 845*b* may electrically connect the second-second unit pad 842*b* and the second-third unit pad 843*b*.

The second-first unit pad 841*b*, the second-second unit pad 842*b*, and the second-third unit pad 843*b* may each have a circular shape. Each of the second-first unit pad 841*b*, the second-second unit pad 842*b*, and the second-third unit pad 843*b* may have a diameter of 0.5 mm±0.1 mm, but is not limited thereto.

That is, the electrical connection between the driving substrate 410 and the coil substrate may be performed by bonding between the second pad portion 840*b* and a second terminal (not shown) formed on the driving substrate 410. In this case, as a contact area between the second pad portion 840*a* and the second terminal increases, the connectivity between the driving substrate 410 and the coil substrate is improved. Therefore, the bonding of the embodiment does not proceed with the second terminal of the driving substrate 410 using only one unit pad, but, as shown in the drawing, the bonding to the second terminal of the driving substrate 410 is performed at a plurality of positions using a plurality of unit pads separated from each other. Accordingly, the embodiment can improve the contact area between the second terminal and the second pad portion 840*b*, and, accordingly, mutual electrical connectivity may be improved.

Hereinafter, a modified example of the above-described coil pattern will be described.

The coil substrate in FIGS. 4 and 5 includes four units. In other words, the coil substrate in FIGS. 4 and 5 includes insulating layers separated from each other, and first to fourth coil units 422, 423, 424, and 425 of the first coil pattern portion 820 and the second coil pattern portion 830 disposed on upper and lower surfaces of each of the separated insulating layers.

Alternatively, all of the four coil units 422, 423, 424, and 425 in the coil substrate may be disposed on one insulating layer.

Figure 7A:
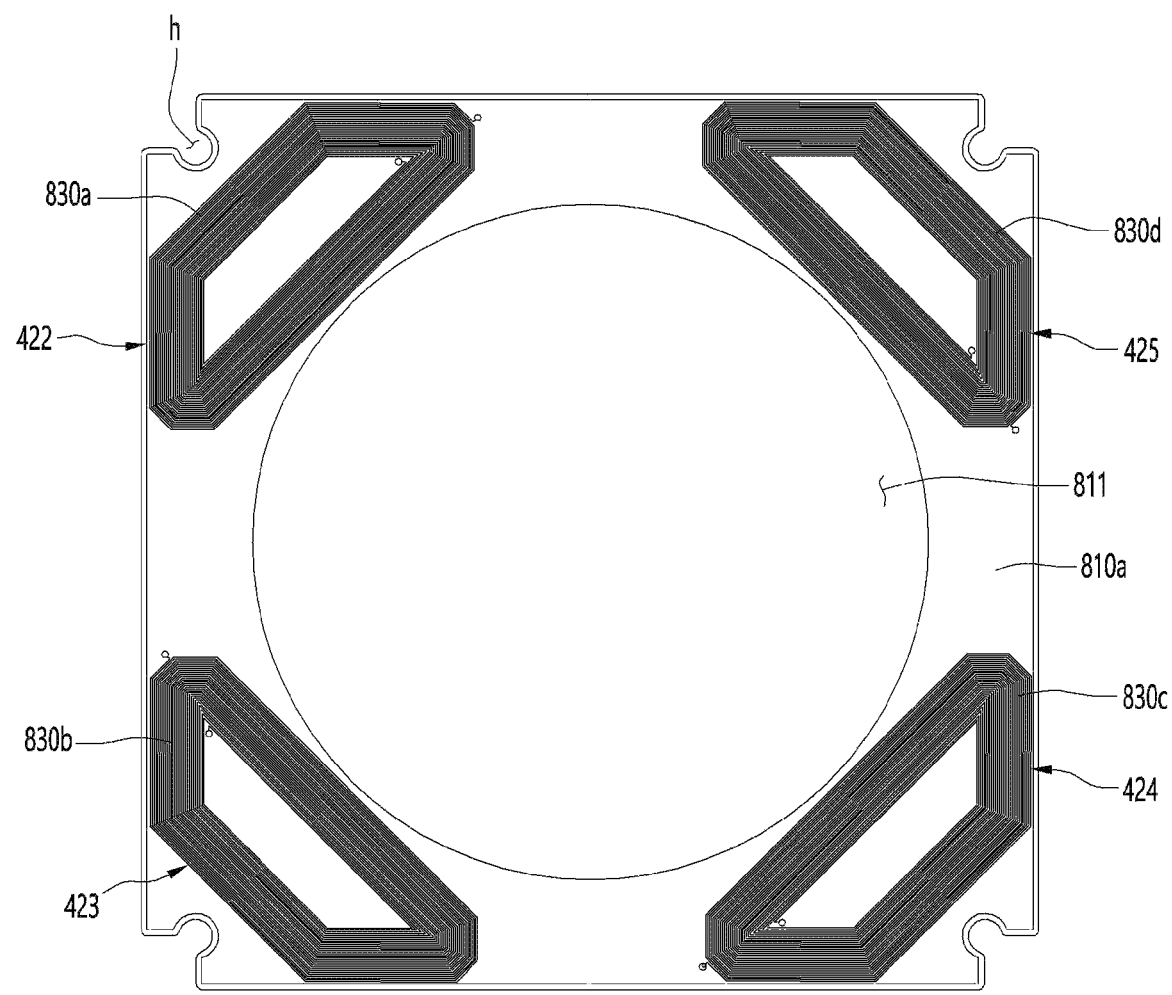
FIG. 7A is a top view of a modified example of a coil substrate.
Figure 7B:
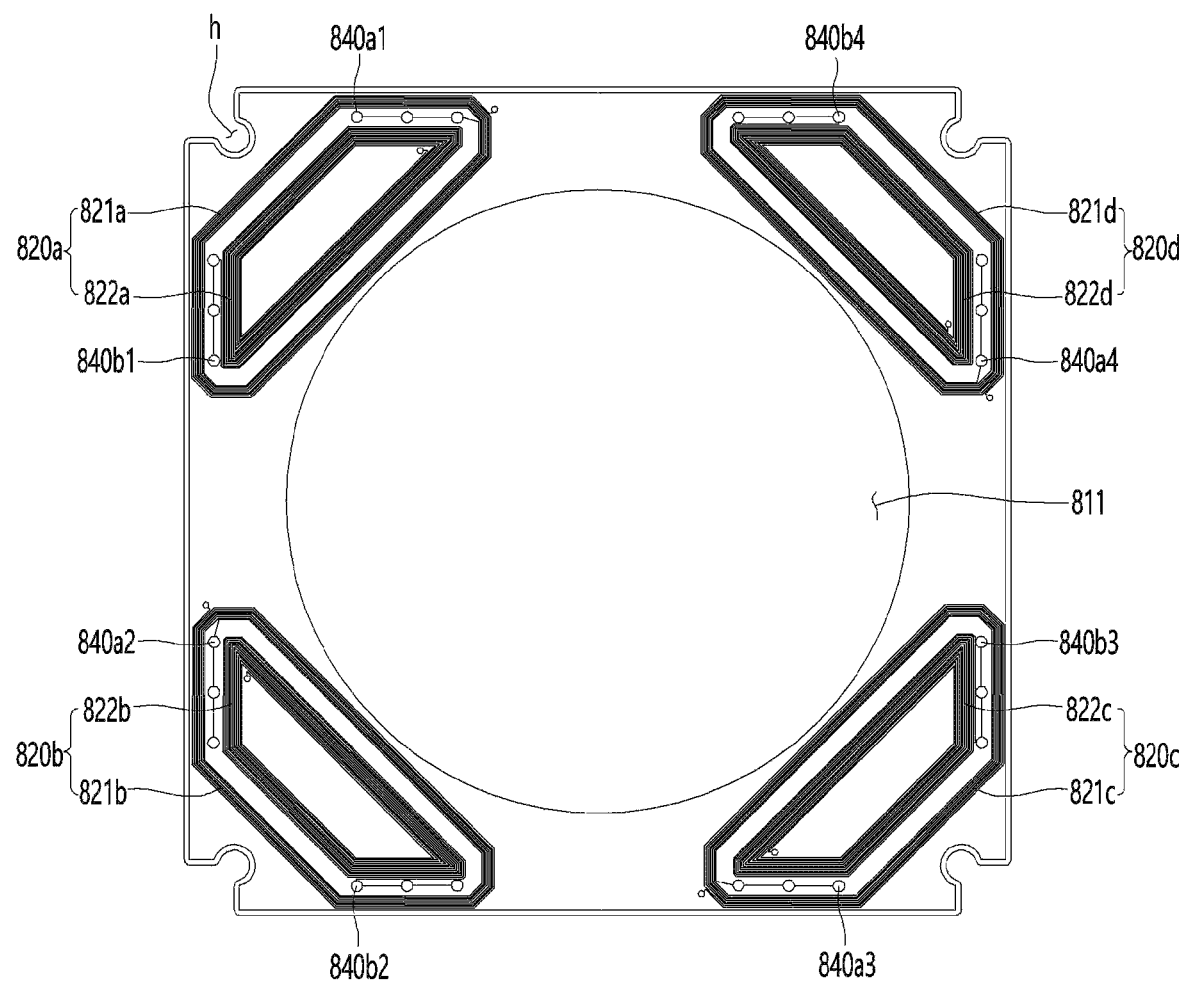
FIG. 7B is a bottom view of a modified example of a coil substrate.

FIGS. 7A and 7B are views showing a modified example of the coil substrate shown in FIGS. 4 and 5.

FIG. 7A is a top view of the coil substrate, and FIG. 7B is a bottom view of the coil substrate.

Referring to FIGS. 7A and 7B, the coil substrate may include an insulating layer 810*a*. The insulating layer 810*a* may include a curved surface. An inner side of the insulating layer 810*a* may include a curved surface. A through hole 811 may pass through the upper and lower surfaces of a center of the insulating layer 810*a*. The through hole 811 may be a region corresponding to the previously described lens portion.

A coupling hole h may be formed in a corner region of the insulating layer 810*a*. The coupling hole h may be used to couple the coil substrate including the insulating layer 810*a* to the driving substrate 410.

The insulating layer 810*a* may have a rectangular shape in a plane as a whole, but is not limited thereto.

The insulating layer 810*a* may include four corner portions. In addition, a first coil pattern portion 820, a second coil pattern portion 830, a first pad portion 840*a* and a second pad portion 840*b* including the first to fourth coil units 422, 423, 424, and 425 may be disposed at four corners of the insulating layer 810*a*.

For example, the second coil pattern portion 830*a* of the first coil unit 422 may be disposed at a first corner portion of the upper surface of the insulating layer 810*a*. For example, the second coil pattern portion 830*b* of the second coil unit 423 may be disposed at a second corner portion of the upper surface of the insulating layer 810*a*. For example, the second coil pattern portion 830*c* of the third coil unit 424 may be disposed at a third corner portion of the upper surface of the insulating layer 810*a*, For example, the second coil pattern portion 830*d* of the fourth coil unit 422 may be disposed at a fourth corner portion of the upper surface of the insulating layer 810*a*.

For example, an inner coil pattern portion 822*a*, an outer coil pattern portion 821*a*, a first pad portion 840*a* 1, and a second pad portion 840*b*1 of the first coil pattern portion 820*a* of the first coil unit 422 may be disposed at a first corner portion of the lower surface of the insulating layer 810. For example, an inner coil pattern portion 822*b*, an outer coil pattern portion 821*b*, a first pad portion 840*a*2, and a second pad portion 840*b*2 of the first coil pattern portion 820*b* of the second coil unit 423 may be disposed at a second corner portion of the lower surface of the insulating layer 810. For example, an inner coil pattern portion 822*c*, an outer coil pattern portion 821*c*, a first pad portion 840*a*3, and a second pad portion 840*b*3 of the first coil pattern portion 820*c* of the third coil unit 424 may be disposed at a third corner portion of the lower surface of the insulating layer 810. For example, an inner coil pattern portion 822*d*, an outer coil pattern portion 821*d*, a first pad portion 840*a*4, and a second pad portion 840*b*4 of the first coil pattern portion 820*d* of the fourth coil unit 425 may be disposed at a fourth corner portion of the lower surface of the insulating layer 810.

Figure 8A:
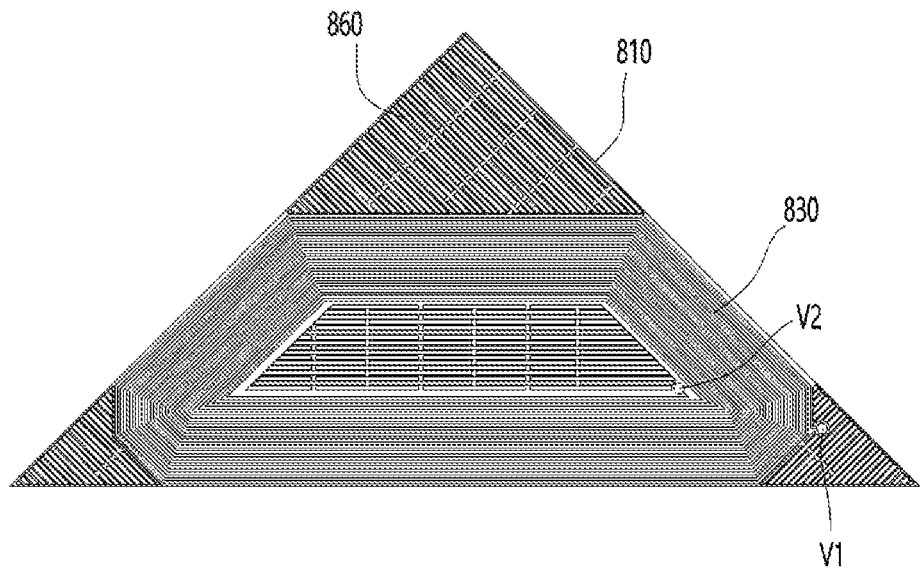
FIG. 8A is a top view of a coil substrate according to another embodiment.
Figure 8B:
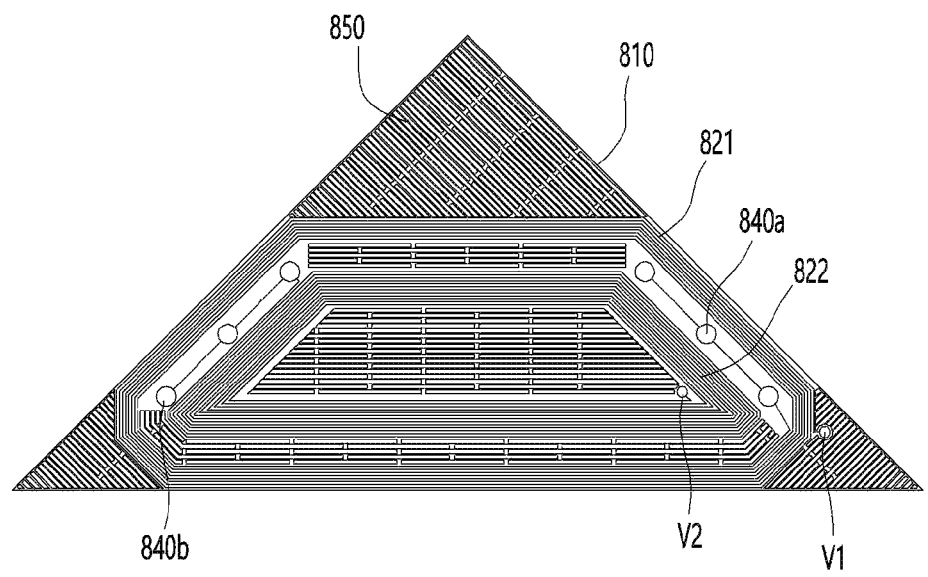
FIG. 8B is a bottom view of a coil substrate according to another embodiment.

FIG. 8A is a top view of a coil substrate according to another erribodiment, and FIG. 8B is a bottom view of a coil substrate according to another embodiment.

Referring to FIGS. 8A and 8B, the coil substrate includes an insulating layer 810. In addition, a first coil pattern portion 820 is disposed on a lower surface of the insulating layer 810. In this case, the first coil pattern portion 820 includes an inner coil pattern portion 822 and an outer coil pattern portion 821. In addition, a second coil pattern portion 830 is disposed on an upper surface of the insulating layer 810. Also, a first pad portion 840*a* and a second pad portion 840*b* are disposed on the lower surface of the insulating layer 810 between the inner coil pattern portion 822 and the outer coil pattern portion 821. Also, a first via V1 connecting the outer coil pattern portion 821 and the second coil pattern portion 830 is formed in the insulating layer 810. In addition, a second via V2 connecting the inner coil pattern portion 822 and the second coil pattern portion 830 is formed in the insulating layer 810.

Since this has been described in detail above with reference to FIGS. 4 and 5, a detailed description thereof will be omitted.

Meanwhile, the lower surface of the insulating layer 810 may include a first region in which the first coil pattern portion 820, the first pad portion 840*a*, the second pad portion 840*b*, the first vias V1 and the second vias V2 are disposed, and a second region other than the first region.

In addition, the upper surface of the insulating layer 810 may include a first region in which the second coil pattern portion 830, the first vias V1 and the second vias V2 are disposed, and a second region other than the first region.

For example, the upper and lower surfaces of the insulating layer 810 may include a first region in which a pattern for transmitting an electrical signal is disposed, and a second region excluding the first region.

In addition, as the area of the second region increases, it may be difficult to uniformly form the thicknesses of the first coil pattern portion 820 and the second coil pattern portion 830, For example, the thickness of the pattern portion positioned in a first-fist region of the first region adjacent to the second region may be different from the thickness of the pattern portion positioned in a first-second region excluding the first-first region. In addition, the resistance of the pattern portion may be increased due to the non-uniformity of the thickness of the pattern portion, and thus the overall Lorentz force may be reduced. Accordingly, a dummy pattern portion corresponding to the first coil pattern portion 820 and the second coil pattern portion 830 in the embodiment is formed in the second region.

The dummy pattern portion may mean a wire having the same metal material and the same shape as the first coil pattern portion 820 and the second coil pattern portion 830, but through which an electrical signal is not transmitted.

For example, a first dummy pattern portion 850 that is not electrically connected to the first coil pattern portion 820 may be disposed on a lower surface of the insulating layer 810. For example, the first dummy pattern portion 850 may be disposed in the second region of the lower surface of the insulating layer 810.

For example, a second dummy pattern portion 860 that is not electrically connected to the second coil pattern portion 830 may be disposed on the upper surface of the insulating layer 810. For example, the second dummy pattern portion 860 may be disposed in the second region of the upper surface of the insulating layer 810.

The first dummy pattern portion 850 may be formed while extending or wound in the same direction as the direction in which the first coil pattern portion 820 extends or is wound. Alternatively, the first dummy pattern portion 850 may be formed by extending or winding in a direction partially different from the direction in which the first coil pattern portion 820 extends or is wound.

The second dummy pattern portion 860 may be formed while extending or wound in the same direction as the direction in which the second coil pattern portion 830 extends or is wound. Alternatively, the second dummy pattern portion 860 may be formed by extending or winding in a direction partially different from the direction in which the second coil pattern portion 830 extends or is wound.

The first dummy pattern portion 850 may be selectively formed in a region where the first coil pattern portion 820 is not disposed in order to make the plating thickness of the first coil pattern portion 820 formed on the lower surface of the insulating layer 810 uniform.

The second dummy pattern portion 860 may be selectively formed in a region where the second coil pattern portion 830 is not disposed in order to make the plating thickness of the second coil pattern portion 830 formed on the upper surface of the insulating layer 810 uniform.

In detail, when a photosensitive pattern for forming the first coil pattern portion 820 or the second coil pattern portion 830 is only formed on the upper surface or the lower surface of the insulating layer 810, it may be difficult to uniformly control the plating thickness of the first coil pattern portion 820 or the second coil pattern portion 830 as a whole. Accordingly, a photosensitive pattern for forming the first dummy pattern portion 850 and the second dummy pattern portion 860 of the embodiment may be additionally formed, and accordingly, the plating area to be plated in each region of the insulating layer can be made uniform. Accordingly, the plating thicknesses of the first coil pattern portion 820 and the second coil pattern portion 830 may be uniformly controlled by additionally forming the first dummy pattern portion 850 and the second dummy pattern portion 860.

Meanwhile, an interval of the first coil pattern portion 820 may be different from an interval of the first dummy pattern portion 850. In addition, an interval of the second coil pattern portion 830 may be different from an interval of the second dummy pattern portion 860. This will be described in more detail below.

Figure 9:
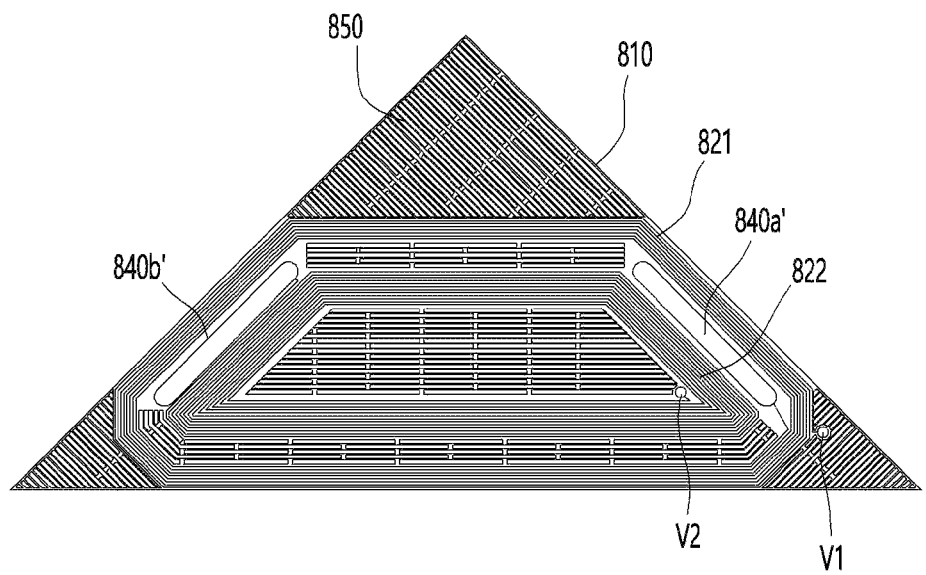
FIG. 9 is a view showing a modified example of a first pad portion and the second pad portion according to an embodiment.

FIG. 9 is a view showing a modified example of a first pad portion and the second pad portion according to an embodiment.

Referring to FIG. 5, the first pad portion 840*a* according to an exemplary embodiment includes a plurality of unit pads. In addition, the second pad portion 840*b* according to an exemplary embodiment includes a plurality of unit pads. This is to increase the contact area between the pad portion and the terminal of the driving substrate 410.

Referring to FIG. 9, the first pad portion 840*a*' and the second pad portion 840*b*' according to another embodiment may include only one unit pad.

That is, the first pad portion 840*a*' may have an elliptical shape and a bar shape elongated in one direction. In this case, a width in the long axis direction of the first pad portion 840*a*' may be 1.0 mm to 2.0 mm, but is not limited thereto. In addition, the second pad portion 840*b*' may have an elliptical shape and a bar shape elongated in one direction. In this case, a width in the long axis direction of the second pad portion 840*b*' may be 1.0 mm to 2.0 mm, but is not limited thereto.

Meanwhile, in FIG. 9, the first pad portion 840*a*' and the second pad portion 840*b*' include only one bar-type unit pad having an elliptical shape, but the embodiment is not limited thereto. For example, each of the first pad portion 840*a*' and the second pad portion 840*b*' may include a plurality of bar-type unit pads having an elliptical shape.

Hereinafter, a thickness, a line width, and an interval of each of the first coil pattern portion 820, the second coil pattern portion 830, the first dummy pattern portion 850, and the second dummy pattern portion 860 according to the embodiment will be described in detail.

Figure 10A:
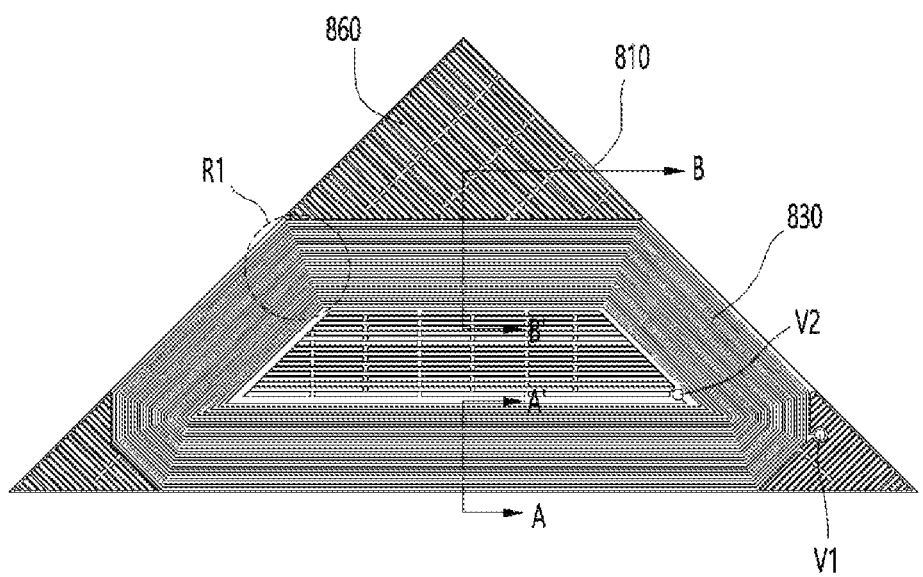
FIG. 10A is a view showing a top view of a coil substrate according to an exemplary embodiment.
Figure 10B:
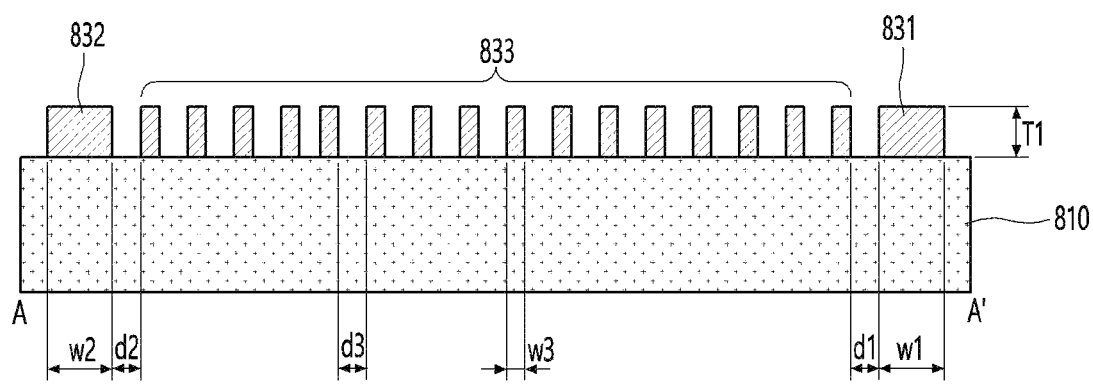
FIG. 10B is a cross-sectional view taken along a region A-A' of FIG. 10A.
Figure 10C:
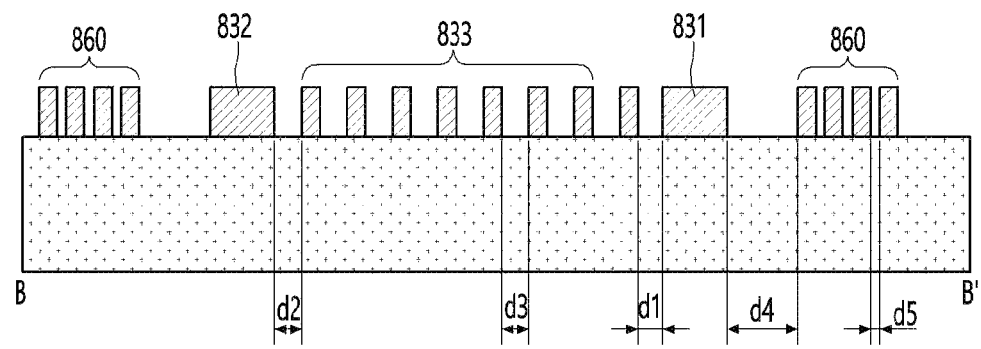
FIG. 10C is a cross-sectional view taken along a region B-B' of FIG. 10A.
Figure 10D:
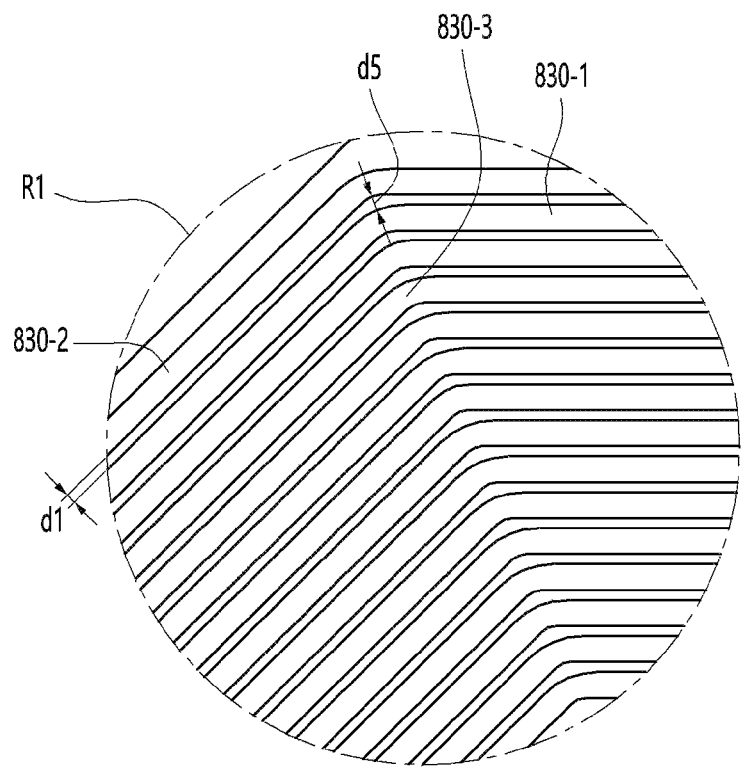
FIG. 10D is an enlarged view of a region R1 of FIG. 10A.

FIG. 10A is a view showing a top view of a coil substrate according to an exemplary embodiment, FIG. 10B is a cross-sectional view taken along a region A-A' of FIG. 10A, FIG. 10C is a cross-sectional view taken along a region B-B' of FIG. 10A, and FIG. 10D is an enlarged view of a region R1 of FIG. 10A. Hereinafter, the second coil pattern portion 830 and the second dummy pattern portion 860 disposed on the upper surface of the insulating layer 810 will be described with reference to FIGS. 10A to 10D.

Referring to FIG. 10A, the second coil pattern portion 830 may be formed by winding on the upper surface of the insulating layer 810 in a clockwise direction from one end of an inside to the other end of an outside. In addition, the second dummy pattern portion 860 may be selectively disposed on the upper surface of the insulating layer 810 in a region where the second coil pattern portion 830 is not disposed.

Referring to FIG. 10B, the second coil pattern portion 830 may be divided into a plurality of parts according to an arrangement position. For example, when a region close to the center of the second coil pattern portion 830 is defined as an inside and a region far from the center is defined as an outside, the second coil pattern portion 830 may be divided into a first part 831 disposed at an innermost side, a second part 832 disposed at an outermost side, and a third part 833 between the first part 831 and the second part 832.

The first part 831 may be positioned adjacent to the center of the second coil pattern portion 830. The first part 831 may be disposed at a position spaced apart from the center of the second coil pattern portion 830 by a predetermined interval to surround the central region of the second coil pattern portion 830. The third part 833 may be disposed to surround the first part 831 at a position spaced apart from the first part 831 by a predetermined interval. The second part 832 may be disposed to surround an outermost second part of the second part 832 at a position spaced apart from the third part 833 by a predetermined interval. Accordingly, the first part 831 may include one end of the second coil pattern portion 830, and the second part 832 may include the other end of the second coil pattern portion 830, and the third part 833 may be a part between the one end and the other end.

The first part 831, the second part 832, and the third part 833 may be defined as regions overlapping an upper magnet portion. For example, the first part 831, the second part 832, and the third part 833 may be disposed to overlap the magnet portion in a vertical direction or an optical axis direction.

The first part 831, the second part 832, and the third part 833 of the second coil pattern portion 830 as described above may have a thickness Ti corresponding to each other. For example, the first part 831, the second part 832, and the third part 833 of the second coil pattern portion 830 of the embodiment may have the same thickness T1 by disposing the second dummy pattern portion 860 on the upper surface of the insulating layer 810. For example, the first part 831, the second part 832, and the third part 833 may have a thickness T1 of 20 μm to 60 μm can be disposed on the upper surface of the insulating layer 810. In detail, the first part 831, the second part 832, and the third part 833 may have a thickness T1 of 30 μm to 50 μm. In more detail, the first part 831, the second part 832, and the third part 833 may have a thickness T1 of 35 μm to 45 μm.

The first part 831 may be disposed to be spaced apart from the third part 833 by a predetermined interval. For example, the first part 831 may be disposed to be spaced apart from an innermost third part 833 of the third part 833 by a predetermined interval. For example, the first part 831 may be disposed to be spaced apart from an innermost third part of the third part 833 by a first interval d1.

The second part 832 may be disposed to be spaced apart from the third part 833 by a predetermined interval. For example, the second part 832 may be disposed to be spaced apart from an outermost third part of the third part 833 by a predetermined interval. For example, the second part 832 may be disposed to be spaced apart from the outermost third part of the third part 833 by a second interval d2.

In addition, the third part 833 may be formed by winding (or rotating or bending) a plurality of times between the first part 831 and the second part 832. In this case, the third part 833 may be disposed to be spaced apart from each other by a third interval d3 between the first part 832 and the second part 833.

The first interval d1, the second interval d2, and the third interval d3 may be formed to have the same or similar size to each other.

For example, the first interval d1, the second interval d2, and the third interval d3 may satisfy a range of 5 μm to 15 μm. In detail, the first interval d1, the second interval d2, and the third interval d3 may satisfy a range of 7 μm to 13 μm.

In more detail, the first interval d1, the second interval d2 and the third interval d3 may satisfy a range of 9 µm to 11 µm.

When the first interval d1, the second interval d2, and the third interval d3 have less than 5 µm, a photosensitive pattern may collapse due to a decrease in the line width of the photosensitive pattern in the process of forming the second coil pattern portion 830, and accordingly, the line width of each part of the second coil pattern portion 830 may become non-uniform. In addition, when the first interval d1, the second interval d2, and the third interval d3 exceed 15 µm, the length of the second coil pattern portion 830 may be increased as a whole.

Meanwhile, at least one of the first part 831, the second part 832, and the third part 833 may have a line width different from that of the other one. For example, the first part 831 may have a first line width w1. Also, the second part 832 may have a second line width w2. Also, the third part 833 may have a third line width w3. In this case, the first line width w1 of the first part 831 may be greater than the third line width w3 of the third part 833. Also, the second line width w2 of the second part 832 may be greater than the third line width w3 of the third part 833. For example, the first line width wl of the first part 831 may be the same as the second line width w2 of the second part 832.

For example, the first line width w1 of the first part 831 and the second line width w2 of the second part 832 may range from 1.1 times to 10 times the third line width w3 of the third part 833.

When the first line width w1 of the first part 831 and the second line width w2 of the second part 832 are less than 1.1 times the third line width w3 of the third part 833, the effect of reducing resistance due to the line width of the first part 831 and the second part 832 cannot be realized. When the first line width wi of the first part 831 and the second line width w2 of the second part 832 exceed 10 times the third line width w3 of the third part 833, the resistance reduction effect due to the line widths of the first part 831 and the second part 832 is insignificant, and the overall volume of the coil substrate may be increased.

Meanwhile, the line width w3 of the third part 833 may be 22 µm to 33 µm. In addition, the line width wi of the first part 831 and the line width w2 of the second part 832 may be 30 µm to 330 µm.

The first line width wl of the first part 831 and the second line width w2 of the second part 832 may be formed to be larger than the line width wi of the first part 831 within the above-described line width range.

Referring to FIG. 10C, the second dummy pattern portion 860 may be disposed adjacent to the first part 831 and the third part 833 of the second coil pattern portion 830.

At this time, the intervals d1, d2, and d3 between the respective parts of the second coil pattern portion 830 in the embodiment may be different from an interval d4 between the second coil pattern portion 830 and the second dummy pattern portion 860. In this case, the interval d4 between the second coil pattern portion 830 and the second dummy pattern portion 860 may mean an interval between the first part 831 and the second dummy pattern portion 860 adjacent thereto or an interval between the third part 833 and the second dummy pattern portion 860 adjacent thereto.

An interval d4 between the second coil pattern portion 830 and the second dummy pattern portion 860 may be 3 µm to 1000 µm. The range of the interval d4 between the second coil pattern portion 830 and the second dummy pattern portion 860 is a range in consideration of the thickness and reliability of the second coil pattern portion 830. In detail, when the interval d4 between the second coil pattern portion 830 and the second dummy pattern portion 860 is less than 3 µm, the line width of the second coil pattern portion 830 and the second dummy pattern portion 860 is formed too small, and accordingly, the photosensitive pattern may collapse. In addition, when the photosensitive pattern collapses, the second coil pattern portion 830 and the second dummy pattern portion 860 may contact each other, and accordingly, the line width of the second coil pattern portion 830 becomes non-uniform, and thus the function of the second dummy pattern portion 860 cannot be sufficiently performed. In addition, when the interval d4 between the second coil pattern portion 830 and the second dummy pattern portion 860 exceeds 1000 µm, the interval between the second coil pattern portion 830 and the second dummy pattern portion 860 becomes too far apart, and accordingly, the plating uniform effect by the second dummy pattern portion 860 cannot be sufficiently achieved.

Referring to FIG. 10D, as described above, the second coil pattern portion 830 may be divided into a plurality of parts according to a position, and differently, it may be divided into a plurality of regions according to an extension direction.

For example, the second coil pattern portion 830 may be divided into a plurality of regions according to directionality. For example, the second coil pattern portion 830 includes a first region 830-1 extending in a first direction, a second region 830-2 extending in a second direction, and a third region 830-3 whose direction is changed between the first region 830-1 and the second region 830-7.

In detail, the first region 830-1 and the second region 830-2 may include a part in which the second coil pattern portion 830 extends in one direction (eg, a straight line). In addition, the third region 830-3 may be a region in which the directionality of the second coil pattern portion 830 changes from one direction to another direction. For example, the third part 830-3 may include a bent portion of the second coil pattern portion 830.

In this case, the number of the third regions 830-3 may vary according to a directionality of the first region 830-1 and the second region 830-2, for example, as shown in FIG. 100, the third region 830-3 may include eight regions.

Here, the interval d5 between the patterns in the third region 830-3 may be different from the interval di between the patterns in the first region 830-1 or the second region 830-2. For example, the interval d5 between the patterns in the third region 830-3 may be different from the interval dl between the patterns in the first region 830-1 or the second region 830-2.

That is, in order to form a pattern in the third region 830-3, a photosensitive pattern corresponding thereto must also be bent and formed. However, due to the characteristics of the material of the photosensitive pattern, it may be easily collapsed upon bending. Therefore, in the embodiment, the width of the photosensitive pattern in the third region 830-3 is greater than the width of the photosensitive pattern in other regions, and accordingly, collapsing of the photosensitive pattern occurring in the bent region can be inhibited, and thus, the reliability of the pattern can be improved.

For example, the interval dl may be 5 µm to 15 µm. When the interval d1 is formed to be less than 5 µm, due to a decrease in the line width of the photosensitive pattern in the process of forming the second coil pattern portion 830, the photosensitive pattern may collapse and the line width may become non-uniform. In addition, when the interval d1 is formed to exceed 15 µm, the area of the second coil pattern portion 830 may be increased as a whole.

In addition, the interval d5 in the third region 830-3 may be 30 μm to 70 μm. When the interval d5 is formed to be less than 30 μm, the photosensitive pattern may collapse in the bent region, and the line widths of the patterns may become non-uniform. In addition, when the interval d2 is formed to exceed 70 μm, a curvature of the patterns in the bent region becomes too large, so that the overall area of the second coil pattern portion 830 may be increased.

Hereinafter, the first coil pattern portion 820 will be described. However, in the following description of the first coil pattern portion 820, a detailed description thereof will be omitted for a part substantially the same as the previously described second coil pattern portion 830. For example, the interval between the first coil pattern portion 820 and the first dummy pattern portion 850 may be correspond to the above-described interval between the second coil pattern portion 830 and the second dummy pattern portion.

Figure 11A:
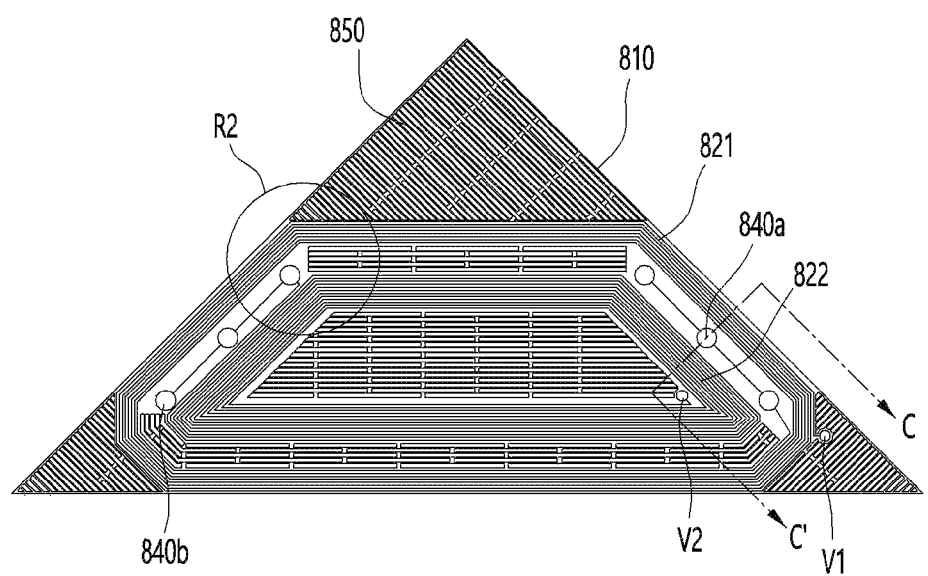
FIG. 11A is a view showing a bottom view of a coil substrate according to an exemplary embodiment.
Figure 11B:
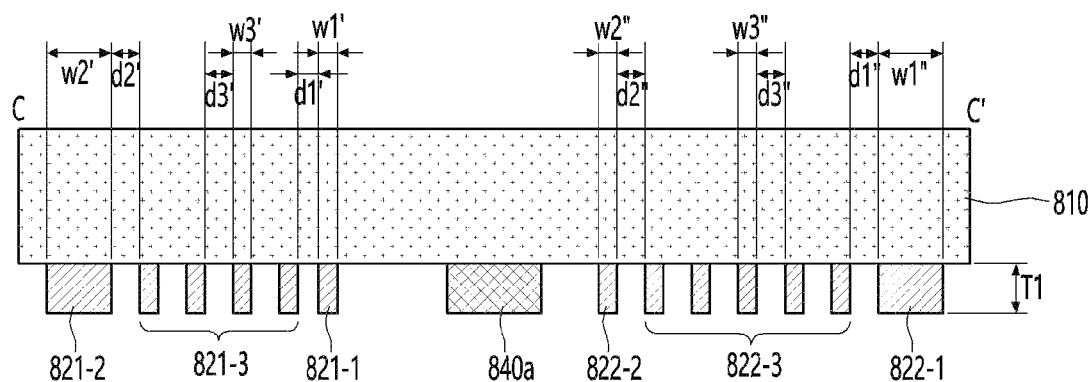
FIG. 11B is a view showing a cross-sectional view taken along a region C-C' of FIG. 11A according to an exemplary embodiment.
Figure 11C:
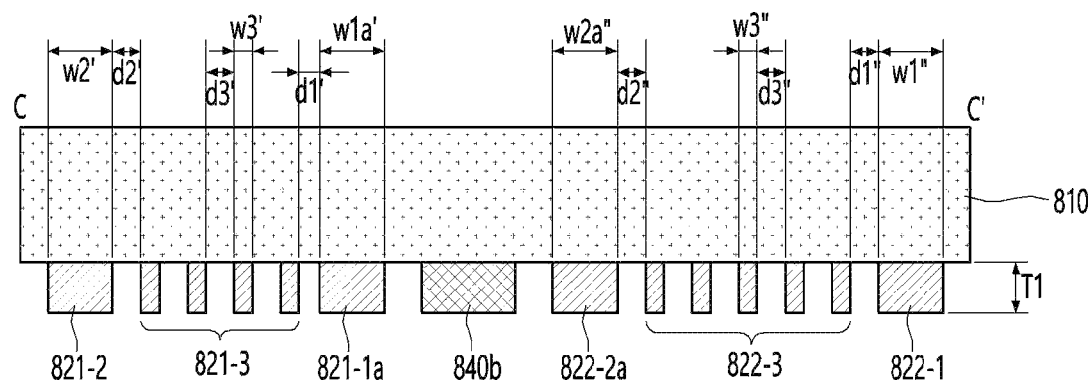
FIG. 11C is a view showing a cross-sectional view taken along a region C-C' of FIG. 11A according to another embodiment.
Figure 11D:
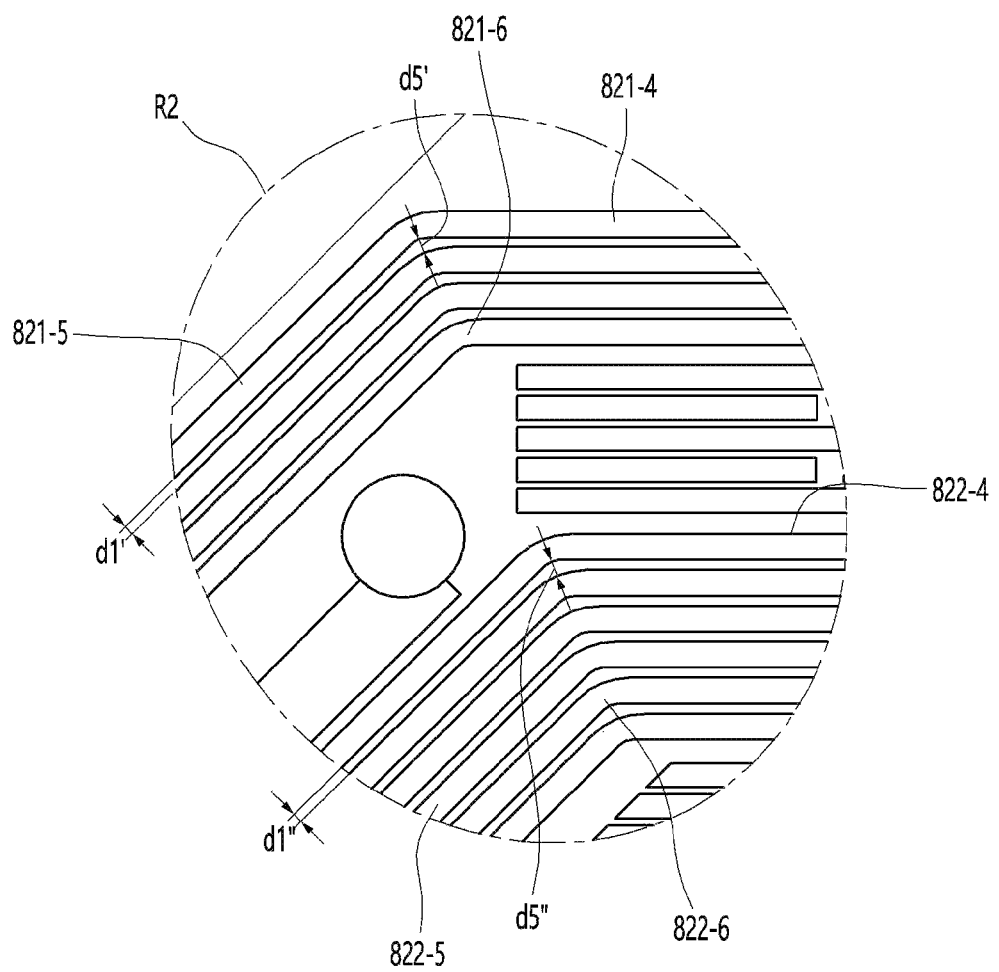
FIG. 11D is an enlarged view of a region R2 of FIG. 11A.

FIG. 11A is a view showing a bottom view of a coil substrate according to an exemplary embodiment, FIG. 11B is a view showing a cross-sectional view taken along a region C-Ce of FIG. 11A according to an exemplary embodiment, FIG. 11C is a view showing a cross-sectional view taken along a region C-C' of FIG. 11A according to another embodiment, and FIG. 11D is an enlarged view of a region R2 of FIG. 11A.

A basic structural feature of the first coil pattern portion 820 may correspond to the basic structural feature of the second coil pattern portion 830. However, unlike the second coil pattern portion 830, the first coil pattern portion 820 includes an outer coil pattern portion 821 and an inner coil pattern portion 822.

Accordingly, an outermost portion of the first coil pattern portion 820 may include only an outermost portion of the outer coil pattern portion 821 among the entire region in which the outer coil pattern portion 821 and the inner coil pattern portion 822 are combined. Alternatively, the outermost portion of the first coil pattern portion 820 may include an outermost portion of the outer coil pattern portion 821 and an outermost portion of the inner coil pattern portion 822 in a division region in which each of the outer coil pattern portion 821 and the inner coil pattern portion 822 is divided. Accordingly, the characteristics of the outermost portion in the portion described for the structural features of the second coil pattern portion 830 can be applied only to the outermost portion of the outer coil pattern portion 821, and alternatively, it may be applied to both the outermost portion of the outer coil pattern portion 821 and the outermost portion of the inner coil pattern portion 822. In addition, the characteristics of the innermost portion in the portion described for the structural features of the second coil pattern portion 830 can be applied only to the innermost portion of the outer coil pattern portion 821, and alternatively, it may be applied to both the innermost portion of the outer coil pattern portion 821 and the innermost portion of the inner coil pattern portion 822.

First, a case in which the characteristics of the outermost and innermost portions of the second coil pattern portion 830 described previously are applied only to the outermost portion of the outer coil pattern portion 821 and the innermost portion of the inner coil pattern portion 822 will be described.

Referring to FIG. 11A, an inner coil pattern portion 822 is disposed on the lower surface of the insulating layer 810 at the inner side of the region where the first pad portion 840a and the second pad portion 8401 are disposed, and an outer coil pattern portion 821 is disposed on the lower surface of the insulating layer 810 at the outer side of the region where the first pad portion 840a and the second pad portion 840b are disposed. In addition, each of the inner coil pattern portion 822 and the outer coil pattern portion 821 may be formed by winding in a clockwise direction from one end of the inner side to the other end of the outer side. Also, the first dummy pattern portion 850 may be selectively disposed on the lower surface of the insulating layer 810 in a region where the inner coil pattern portion 822 and the outer coil pattern portion 821 are not disposed.

Referring to FIG. 11B, the inner coil pattern portion 822 and the outer coil pattern portion 821 may be divided into a plurality of parts according to their arrangement positions. For example, when a region close to the center of the first coil pattern portion 820 is defined as an inside and a region far from the center is defined as an outside, the outer coil pattern portion 821 may include a first part 821-1 disposed on an innermost side, a second part 821-2 disposed on an outermost side, and a third part 821-3 disposed therebetween. In addition, the inner coil pattern portion 822 may include a first part 821-1 disposed on an innermost side, a second part 822-2 disposed on an outermost side, and a third part 822-3 disposed therebetween.

In this case, since the division of each part of the inner coil pattern portion 822 and the outer coil pattern portion 821 has already been described in the second coil pattern portion 830, a detailed description thereof will be omitted.

The first part 821-1, the second part 821-2, and the third part 821-3 of the outer coil pattern portion 821 may have a thickness T1 corresponding to each other. In addition, the first part 822-1, the second part 822-2, and the third part 822-3 of the inner coil pattern portion 822 may have a thickness T1 corresponding to each other. For example, a thickness of each part of the outer coil pattern portion 821 may be the same as a thickness of each part of the inner coil pattern portion 822. For example, the thickness of each part of the outer coil pattern portion 821 may be the same as the thickness of each part of the second coil pattern portion 830. For example, the thickness of each part of the inner coil pattern portion 822 may be the same as the thickness of each part of the second coil pattern portion 830.

For example, the thickness of each part of the inner coil pattern portion 822 and the outer coil pattern portion 821 of the embodiment may be uniformly controlled by disposing the first dummy pattern portion 850 on the lower surface of the insulating layer 810 For example, each part of the inner coil pattern portion 822 and each part of the outer coil pattern portion 821 may have a thickness T1 of 30 μm to 50 μm. In more detail, each part of the inner coil pattern portion 822 and each part of the outer coil pattern portion 821 may have a thickness T1 of 35 μm to 45 μm.

The first part 821-1 of the outer coil pattern portion 821 may be disposed to be spaced apart from the third part 821-3 of the outer coil pattern portion 821 by a predetermined interval. For example, the first part 821-1 of the outer coil pattern portion 821 may be disposed to be spaced apart from an innermost third part of the third part 821-3 by a predetermined interval. For example, the first part 821-1 of the outer coil pattern portion 821 may be disposed to be spaced apart from an innermost third part of the third part 821-3 by a first interval d1'.

The second part 821-2 of the outer coil pattern portion 821 may be disposed to be spaced apart from the third part 821-3 by a predetermined interval. For example, the second part 821-2 of the outer coil pattern portion 821 may be disposed to be spaced apart from an outermost third part of the third part 821-3 by a predetermined interval. For example, the second part 821-2 of the outer coil pattern portion 821 may be disposed to be spaced apart from the third outermost part of the third part 821-3 by a second interval d2'.

In addition, the third part 821-3 of the outer coil pattern portion 821 may be wound (or rotated or bent) a plurality of times between the first part 821-1 and the second part 821-2. In this case, the third part 821-3 of the outer coil pattern portion 821 may be disposed to be spaced apart from each other by a third interval d3' between the first part 821-2 and the second part 821-3.

The first interval d1', the second interval d2', and the third interval d3' may have the same or similar size.

For example, the first interval dr, the second interval d2', and the third interval d3' may satisfy a range of 5 μm to 15 μm. In detail, the first interval dr, the second interval d2', and the third interval d3' may satisfy a range of 7 μm to 13 μm. In more detail, the first interval di', the second interval d2', and the third interval d3' may satisfy a range of 9 μm to 11 μm.

When the first interval d1', the second interval d2', and the third interval d3' have less than 5 μm, a photosensitive pattern may collapse due to a decrease in the line width of the photosensitive pattern in the process of the outer coil pattern portion 821, and accordingly, the line width of each part of the outer coil pattern portion 821 may become non-uniform. In addition, when the first interval d1', the second interval d2', and the third interval d3' exceed 15 μm, the length of the outer coil pattern portion 821 may be increased as a whole.

Meanwhile, at least one of the first part 821-1, the second part 821-2, and the third part 821-3 of the outer coil pattern portion 821 may have a line width different from that of the other one. For example, the first part 821-1 of the outer coil pattern portion 821 may have a first line width w1'. In addition, the second part 821-2 of the outer coil pattern portion 821 may have a second line width w2'. Also, the third part 821-3 of the outer coil pattern portion 821 may have a third line width w3'. At this time, the first line width w1' of the first part 821-1 of the outer coil pattern portion 821 may be corresponded to the third line width w3' of the third part 821-3. In addition, the second line width w2' of the second part 821-2 of the outer coil pattern portion 821 may be greater than the third line width w3' of the third part 821-3 and the first line width of the part 821-1.

For example, the second line width w2' of the second part 821-2 may have a range of 1.1 to 10 times the first line width w1' of the first part 821-1 and the third line width w3' of the third part 821-3.

When the second line width w2' of the second part 821-2 is less than 1.1 times the first line width w1' of the first part 831 and the third line width w3', the effect of reducing resistance due to the line width of the second part 821-2 cannot be realized. When the second line width w2' of the second part 821-2 is the first line width w1' of the first part 821-1 and the third line width w1' of the third part 821-3 w3'), the effect of reducing the resistance due to the line width of the second part 821-2 is insignificant, and may rather increase the overall volume of the coil substrate.

Meanwhile, the first line width w1' of the first part 821-1 and the line width w3' of the third part 821-3 may be 22 μm to 33 μm. In addition, the line width w2' of the second part 821-2 may be 30 μm to 330 μm.

Meanwhile, the first part 822-1 of the inner coil pattern portion 822 may be disposed to be spaced apart from the third part 822-3 of the inner coil pattern portion 822 by a predetermined interval. For example, the first part 822-1 of the inner coil pattern portion 822 may be disposed to be spaced apart from an innermost third part of the third part 822-3 by a predetermined intergyral. For example, the first part 822-1 of the inner coil pattern portion 822 may be disposed to be spaced apart from the innermost third part of the third part 822-3 by a first interval d1'.

The second part 822-2 of the inner coil pattern portion 822 may be disposed to be spaced apart from the third part 822-3 by a predetermined interval. For example, the second part 822-2 of the inner coil pattern portion 822 may be disposed to be spaced apart from an outermost third part of the third part 822-3 by a predetermined interval. For example, the second part 822-2 of the inner coil pattern portion 822 may be disposed to be spaced apart from the third outermost part of the third part 822-3 by a second interval d2'.

In addition, the third part 822-3 of the inner coil pattern portion 822 may be wound (or rotated or bent) a plurality of times between the first part 822-1 and the second part 822-2. In this case, the third part 822-3 of the inner coil pattern portion 822 may be disposed to be spaced apart from each other by a third interval d3" between the first part 822-2 and the second part 822-3.

The first interval d1', the second interval d2' and the third interval d3" is substantially the same as the first interval dr, the second interval d2' and the second interval d3", and a detailed description thereof will be omitted.

Meanwhile, at least one of the first part 822-1, the second part 822-2, and the third part 822-3 of the inner coil pattern portion 822 may have a line width different from that of the other one. For example, the first part 822-1 of the inner coil pattern portion 822 may have a first line width w1'. In addition, the second part 822-2 of the inner coil pattern portion 822 may have a second line width w2'. In addition, the third part 822-3 of the inner coil pattern portion 822 may have a third line width w3'. In this case, the first line width w1' is substantially the same as the line width w1 of the innermost portion of the second coil pattern portion 830 and the line width w2' of the outermost portion of the outer coil pattern portion 821, and a detailed description thereof will be omitted. In addition, In addition, the line width w2" of the second part 822-2 of the inner coil pattern portion 822 and the line width w3" of the third part 822-3 may be the same as each other, and since this has already been described above, a detailed description thereof will be omitted.

On the other hand, when the inner coil pattern portion 822 and the outer coil pattern portion 821 in the above are viewed as one combination coil, only the outermost portion and the innermost portion were changed in the line width of the pattern.

Alternatively, as shown in FIG. 11C, the inner coil pattern portion 822 and the outer coil pattern portion 821 are viewed as individual coils, respectively, and accordingly, the line widths of the outermost portion and the innermost portion of the inner coil pattern portion 822 may be changed, and correspondingly, the line widths of the outermost portion and the innermost portion of the outer coil pattern portion 821 may be changed, For example, at least one of the first part 821-1*a*, the second part 821-2, and the third part 821-3 of the outer coil pattern portion 821 may have a line width different from that of the other one. For example, the first part 821-1 of the outer coil pattern portion 821 may have a first line width w1*a*'. In addition, the second part 821-2 of the outer coil pattern portion 821 may have a second line width w2', Also, the third part 821-3 of the outer coil pattern portion 821 may have a third line width w3'. At this time, since the second line width w2' and the third line width w3' have already been described in FIG. 11B, a detailed description thereof will be omitted, However, the first line width in FIG. 11B was the same as the third line width w3, but the line width w1a' of the first part 821-1a of the outer coil pattern portion 821 in FIG. 11C may be the same as the line width w2' of the second part 821-2 disposed at the outermost side and greater than the line width w3' of the third part 821-3.

Also, at least one of the first part 822-1, the second part 822-2a, and the third part 822-3 of the inner coil pattern portion 821 may have a line width different from that of the other one. For example, the first part 822-1 of the inner coil pattern portion 822 may have a first line width w1". In addition, the second part 822-2a of the inner coil pattern portion 822 may have a second line width w2a", Also, the third part 822-3 of the inner coil pattern portion 822 may have a third line width w3'. At this time, since the first line width w1" and the third line width w3" have already been described in FIG. 11B, a detailed description thereof will be omitted.

However, the second line width w2" in FIG. 11.1B was the same as the third line width w3, but the line width w2a" of the second part 822-2a of the inner coil pattern portion 822 in FIG. 11C may be the same as the line width 10" of the first part 822-1 disposed at the innermost side and greater than the line width w3" of the third part 822-3.

Referring to FIG. 11D, as described above, the first coil pattern portion 820 may be divided into a plurality of parts according to a position, and differently, it may be divided into a plurality of regions according to an extension direction.

For example, the outer coil pattern portion 821 may be divided into a plurality of regions according to directionality. For example, the outer coil pattern portion 821 includes a first region 821-4 extending in a first direction, a second region 821-5 extending in a second direction, and a third region 821-6 whose direction is changed between the first region 821-4 and the second region 821-5.

In detail, the first region 821-4 and the second region 821-5 of the outer coil pattern portion 821 may include a part in which the outer coil pattern portion 821 extends in one direction (eg, a straight line). In addition, the third region 821-6 of the outer coil pattern portion 821 may be a region in which the directionality of the outer coil pattern portion 821 changes from one direction to another direction. For example, the third part 821-6 of the outer coil pattern portion 821 may include a bent portion of the outer coil pattern portion 821.

In this case, the number of the third regions 821-6 of the outer coil pattern portion 821 may vary according to a directionality of the first region 821-4 and the second region 821-5, for example, as shown in FIG. 10A, the third region 821-6 may include eight regions.

Here, the interval d5' between the patterns in the third region 821-6 of the outer coil pattern portion 821 may be different from the interval d1' between the patterns in the first region 821-4 or the second region 821-5. For example, the interval d5' between the patterns in the third region 821-6 of the outer coil pattern portion 821 may be different from the interval d1' between the patterns in the first region 821-4 or the second region 821-5.

That is, in order to form a pattern in the third region 821-5 of the outer coil pattern portion 821, a photosensitive pattern corresponding thereto must also be bent and formed. However, due to the characteristics of the material of the photosensitive pattern, it may be easily collapsed upon bending, Therefore, in the embodiment, the width of the photosensitive pattern in the third region 821-6 of the outer coil pattern portion 821 is greater than the width of the photosensitive pattern in other regions, and accordingly, collapsing of the photosensitive pattern occurring in the bent region can be inhibited, and thus, the reliability of the pattern can be improved.

For example, the inner coil pattern portion 822 may be divided into a plurality of regions according to directionality. For example, the inner coil pattern portion 822 includes a first region 822-4 extending in a first direction, a second region 822-5 extending in a second direction, and a third region 822-6 whose direction is changed between the first region 822-4 and the second region 822-5.

In detail, the first region 822-4 and the second region 822-5 of the inner coil pattern portion 822 may include a part in which the inner coil pattern portion 822 extends in one direction leg, a straight line). In addition, the third region 822-6 of the inner coil pattern portion 822 may be a region in which the directionality of the inner coil pattern portion 822 changes from one direction to another direction. For example, the third part 822-6 of the inner coil pattern portion 822 may include a bent portion of the inner coil pattern portion 822.

In this case, the number of the third regions 822-6 of the inner coil pattern portion 822 may vary according to a directionality of the first region 822-4 and the second region 822-5, for example, as shown in FIG. 10A, the third region 822-6 may include four regions.

Here, the interval d5" between the patterns in the third region 822-6 of the inner coil pattern portion 822 may be different from the interval d1" between the patterns in the first region 822-4 or the second region 822-5, For example, the interval d5" between the patterns in the third region 822-6 of the inner coil pattern portion 822 may be different from the interval d1" between the patterns in the first region 822-4 or the second region 822-5.

That is, in order to form a pattern in the third region 822-5 of the inner coil pattern portion 822, a photosensitive pattern corresponding thereto must also be bent and formed. However, due to the characteristics of the material of the photosensitive pattern, it may be easily collapsed upon bending. Therefore, in the embodiment, the width of the photosensitive pattern in the third region 822-6 of the inner coil pattern portion 822 is greater than the width of the photosensitive pattern in other regions, and accordingly, collapsing of the photosensitive pattern occurring in the bent region can be inhibited, and thus, the reliability of the pattern can be improved, The coil substrate according to the embodiment includes a first coil pattern portion 820 disposed on a lower surface of the insulating layer 810 and a second coil pattern portion 830 disposed on an upper surface of the insulating layer 810. In this case, the first coil pattern portion 820 and the second coil pattern portion 830 may be wound in the same direction from the inside to the outside. Accordingly, a process of forming the coil pattern on the insulating layer 810 of the embodiment can be simplified by forming the first coil pattern portion 820 and the second coil pattern portion 830 to be wound in the same direction from the inside to the outside. In addition, since current flows in the same direction in the inner/outer coils of the first coil pattern portion 820 of the embodiment, a Lorentz force generated according to a rotational direction of a coil may be maximized. In addition, it is possible to secure the Lorentz force for OIS with only two layers of coil patterns.

In addition, the first coil pattern portion 820 of the embodiment includes an outer coil pattern portion 821 disposed on the outside thereof with the first pad portion 840a and the second pad portion 840b therebetween, and an inner coil pattern portion 822 disposed on the inside thereof. The coil pattern portion and the pad portion of the embodiment are disposed on the same layer, and thereby, there is no need to additionally configure a separate layer to form the pad portion, and accordingly, it is possible to achieve simplification of the manufacturing process and reduction of manufacturing cost. In addition, since a number of turns of the first coil pattern portion 820 can be increased, the Lorentz force generated by the first coil pattern portion 820 can be maximized, and accordingly, OIS operation reliability can be secured only with a two-layer structure.

In addition, the coil pattern portion of the embodiment includes an inner coil pattern portion 822 and an outer coil pattern portion 821 respectively disposed the outside and the inside the first pad portion 840a and the second pad portion 840b rather than on one side of the first pad portion 840a and the second pad portion 840b. Accordingly, an overall width of the outer side of the first coil pattern portion 820 may be maintained to the maximum, and thus the strength of the Lorentz force may be increased. In addition, positional balance with the magnet portion in the vertical direction of the embodiment may be maintained by disposing the inner coil pattern portion 822 and the outer coil pattern portion 821 on each of the outside and the inner side of the first pad portion 840a and the second pad portion 840b. In other words, it is possible to minimize the phenomenon that the Lorentz force generated when the first coil exists only on one side of the inside/outside is biased toward either side of the inside/outside, and accordingly, the reliability of the OIS operation may be improved.

In addition, the bonding between the driving substrate 410 and the coil substrate is not performed using only one unit pad, but bonding is performed between the terminal of the driving substrate 410 and the coil substrate at a plurality of positions using a plurality of unit pads. Accordingly, a contact area between the terminal of the driving substrate and the pad portion of the coil substrate according to the embodiment may be improved, and thus mutual electrical connectivity may be improved.

In addition, the first dummy pattern portion 850 and the second dummy pattern portion 860 of the embodiment are formed in a region where the first coil pattern portion 820 and the second coil pattern portion 830 are not disposed on the upper and lower surfaces of the insulating layer 810. According to this, a plating area in which plating is performed in an entire region of the insulating layer can be made uniform by the formation of the first dummy pattern portion 850 and the second dummy pattern portion 860, and accordingly, the plating thicknesses of the first coil pattern portion 820 and the second coil pattern portion 830 may be uniformly controlled.

Therefore, it is possible to sufficiently secure the thickness of the coil pattern portion that serves to inhibit hand shake of the camera module according to the embodiment, thereby reducing the resistance of the coil substrate. Accordingly, the electromotive force of the coil substrate can be sufficiently generated, thereby improving the characteristics of the coil substrate and improving the hand shake prevention characteristics of the camera module including the same.

In addition, an interval of the coil pattern portions may be formed differently for each region in the coil substrate of the embodiment. In detail, the coil pattern portion may be formed so that the interval between the patterns in the bending region is greater than the interval between the patterns in the other regions. Accordingly, when forming the coil pattern portion of the embodiment, it is possible to increase a line width of a photosensitive pattern, thereby inhibiting the photosensitive pattern from collapsing, which is weakly supported in the bent region. Specifically, the photosensitive pattern can be stably formed even in the bent region by forming the photosensitive pattern larger than other regions in the bent region implemented with the fine line width of the embodiment. Accordingly, the coil substrate according to the embodiment may inhibit a short circuit between the coil patterns in the bending region, thereby improving reliability.

In addition, the line width of the innermost and/or outermost portion of the coil pattern portions in the coil substrate of the embodiment may be formed to be different from the line width of the patterns disposed therebetween. In detail, the line width of the innermost and/or outermost portion of the coil pattern portions in the embodiment may be formed to be greater than the line width of the patterns disposed therebetween. Accordingly, in the embodiment, the resistance may be reduced by increasing the pattern line width, which is one variable of the resistance of the coil pattern portion.

Features, structures, effects, etc. described in the above embodiments are included in at least one embodiment, and it is not necessarily limited to only one embodiment. Furthermore, features, structures, effects, etc. illustrated in each embodiment can be combined or modified for other embodiments by those of ordinary skill in the art to which the embodiments belong. Accordingly, the contents related to such combinations and variations should be interpreted as being included in the scope of the embodiments.

In the above, the embodiment has been mainly described, but this is only an example and does not limit the embodiment, and those of ordinary skill in the art to which the embodiment pertains will appreciate that various modifications and applications not illustrated above are possible without departing from the essential characteristics of the present embodiment. For example, each component specifically shown in the embodiment can be implemented by modification. And the differences related to these modifications and applications should be interpreted as being included in the scope of the embodiments set forth in the appended claims.

What is claimed is:

1. A coil substrate comprising:
   an insulating layer;
   a first coil pattern portion disposed on one surface of the insulating layer;
   a second coil pattern portion disposed on another surface of the insulating layer; and
   a pad portion disposed on the one surface of the insulating layer and connected to the first coil pattern portion,
   wherein the first coil pattern portion includes:
   an inner coil pattern portion; and
   an outer coil pattern portion spaced apart from the inner coil pattern portion at a predetermined interval and disposed surrounding an outside of the inner coil pattern portion,
   wherein the pad portion is disposed between the outside of the inner coil pattern portion and an inside of the outer coil pattern portion,
   wherein the inner coil pattern portion and the outer coil pattern portion are electrically connected to each other through the second coil pattern portion, and
   wherein each of the inner coil pattern portion, the outer coil pattern portion, and the second coil pattern portion viewed from above are formed by winding from an inner end toward an outer end in a same direction,
   wherein the pad portion includes:

a first pad portion connected to the inner end of the outer coil pattern portion; and a second pad portion connected to the outer end of the inner coil pattern portion, wherein the inner coil pattern portion includes a first outer side and a second outer side opposite to the first outer side, wherein the outer coil pattern portion includes a first inner side facing the first outer side, and a second inner side facing the second outer side, wherein the first pad portion is disposed between the first outer side and the first inner side, and wherein the second pad portion is disposed between the second outer side and the second inner side.

2. The coil substrate of claim 1, wherein the first pad portion includes: a first-first unit pad connected to the inner end of the outer coil pattern portion; a first-second unit pad spaced apart from the first-first unit pad; and a first connection pattern connecting the first-first unit pad and the first-second unit pad; wherein the second pad portion includes: a second-first unit pad connected to the outer end of the inner coil pattern portion; a second-second unit pad spaced apart from the second-first unit pad; and a second connection pattern connecting the second-first unit pad and the second-second unit pad.

3. The coil substrate of claim 1, comprising: a first via passing through the insulating layer and having one surface connected to the outer end of the outer coil pattern portion and another surface connected to the outer end of the second coil pattern portion; and a second via passing through the insulating layer and having one surface connected to an inner end of the inner coil pattern portion and another surface connected to the inner end of the second coil pattern portion, and wherein the inner coil pattern portion is electrically connected to the outer coil pattern portion through the first via, the second via, and the second coil pattern portion.

4. The coil substrate of claim 1, wherein an outer width of the first coil pattern portion corresponding to an outer width of the outer coil pattern portion is the same as an outer width of the second coil pattern portion, and wherein an inner width of the first coil pattern portion corresponding to an inner width of the inner coil pattern portion is the same as an inner width of the second coil pattern portion.

5. The coil substrate of claim 1, comprising:

a first dummy pattern portion disposed on the one surface of the insulating layer and spaced apart from the first coil pattern portion; and a second dummy pattern portion disposed on the other surface of the insulating layer and spaced apart from the second coil pattern portion.

6. The coil substrate of claim 5, wherein the first dummy pattern portion is formed between the outer coil portion and the inner coil portion.

7. The coil substrate of claim 1, wherein at least one of the first coil pattern portion and the second coil pattern portion includes:

a first region extending in a first direction;

a second region extending in a second direction different from the first direction; and a third region in which a directionality of the coil pattern portion is changed between the first region and the second region;

wherein an interval between coil pattern portions in the third region is greater than an interval between coil pattern portions in the first region or the second region.

8. The coil substrate of claim 1, wherein at least one of the inner coil pattern portion, the outer coil pattern portion, and the second coil pattern portion includes:

a first part disposed on an innermost side;

a second part disposed on an outermost side; and a third part between the first part and the second part; and wherein at least one of a line width of the first part and a line width of the second part is greater than a line width of the third part.

9. The coil substrate of claim 1, wherein the inner coil pattern portion and the outer coil pattern portion of the first coil pattern portion are disposed on a same plane of one surface of the insulating layer.

10. The coil substrate of claim 9, wherein an upper surface of the inner coil pattern portion is positioned on the same plane as an upper surface of the outer coil pattern portion.

11. The coil substrate of claim 9, wherein a lower surface of the inner coil pattern portion is positioned on the same plane as a lower surface of the outer coil pattern portion.

12. The coil substrate of claim 1, wherein the second coil pattern portion includes:

a first region vertically overlapping with the inner coil pattern portion;

a second region vertically overlapping with the outer coil pattern portion; and a third region vertically overlapping with a spaced region between the inner coil pattern portion and the outer coil pattern portion.

13. The coil substrate of claim 12, wherein the third region of the second coil pattern portion includes a portion vertically overlapping with the pad portion.

14. A camera module comprising:

a first mover disposed on a side surface of a lens portion to move the lens portion;

a second mover disposed opposite to the first mover on a side surface of the first mover;

a stator disposed opposite to a lower side of the second mover to move the second mover and having a through hole corresponding to the lens portion formed in a center; and a base supporting the stator and the second mover and having a hollow hole in a center corresponding to the through hole of the second mover;

wherein the stator includes a driving substrate and two or more coil substrates disposed on the driving substrate, wherein each of the coil substrates includes: an insulating layer;

a first coil pattern portion disposed on one surface of the insulating layer;

a second coil pattern portion disposed on another surface of the insulating layer; and a pad portion disposed on the one surface of the insulating layer and connected to the first coil pattern portion, wherein the first coil pattern portion includes:

an inner coil pattern portion; and an outer coil pattern portion spaced apart from the inner coil pattern portion at a predetermined interval and disposed surrounding an outside of the inner coil pattern portion, and wherein the pad portion is disposed between the outside of the inner coil pattern portion and an inside of the outer coil pattern portion, wherein the inner coil pattern portion and the outer coil pattern portion are electrically connected to each other through the second coil pattern portion, and wherein the inner coil pattern portion, the outer coil pattern portion and the second coil pattern portion are formed by winding from an inner end toward an outer end in a same direction,
wherein the coil substrate includes:
a first via passing through the insulating layer and having one surface connected to the outer end of the outer coil pattern portion and another surface connected to the outer end of the second coil pattern portion; and
a second via passing through the insulating layer and having one surface connected to the inner end of the inner coil pattern portion and another surface connected to the inner end of the second coil pattern portion, and
wherein the inner coil pattern portion is electrically connected to the outer coil pattern portion through the first via, the second via, and the second coil pattern portion.

15. The camera module of claim 14, wherein the inner coil pattern portion and the outer coil pattern portion of the first coil pattern portion are disposed on a same plane of one surface of the insulating layer.

16. The camera module of claim 15, wherein at least one of upper and lower surfaces of the inner coil pattern portion is positioned on the same plane as at least one of upper and lower surfaces of the outer coil pattern portion.

17. The camera module of claim 14, wherein the second coil pattern portion includes:
a first region vertically overlapping with the inner coil pattern portion;
a second region vertically overlapping with the outer coil pattern portion; and
a third region vertically overlapping with a spaced region between the inner coil pattern portion and the outer coil pattern portion.

\* \* \* \* \*